United States Patent [19]

Erdman

[11] Patent Number: 4,654,566
[45] Date of Patent: Mar. 31, 1987

[54] CONTROL SYSTEM, METHOD OF OPERATING AN ELECTRONICALLY COMMUTATED MOTOR, AND LAUNDERING APPARATUS

[75] Inventor: David M. Erdman, Fort Wayne, Ind.
[73] Assignee: General Electric Company, Fort Wayne, Ind.
[21] Appl. No.: 463,147
[22] Filed: Feb. 2, 1983

Related U.S. Application Data

[63] Continuation-in-part of Ser. No. 412,421, Aug. 27, 1982, Pat. No. 4,449,079, which is a continuation of Ser. No. 141,267, Apr. 17, 1980, abandoned, which is a continuation-in-part of Ser. No. 077,656, Sep. 21, 1979, abandoned, which is a continuation-in-part of Ser. No. 802,484, Jun. 1, 1977, Pat. No. 4,169,990, which is a continuation-in-part of Ser. No. 729,761, Oct. 5, 1976, abandoned, which is a continuation-in-part of Ser. No. 482,409, Jun. 24, 1974, Pat. No. 4,005,347.

[51] Int. Cl.$^4$ ............................................. H02P 6/02
[52] U.S. Cl. ..................... 318/254; 318/138; 318/439; 318/599
[58] Field of Search ............... 318/138, 254, 254 A, 318/439, 599, 811

[56] References Cited

U.S. PATENT DOCUMENTS

| | | | |
|---|---|---|---|
| 3,304,481 | 2/1967 | Saussele | 318/138 |
| 3,329,852 | 7/1967 | Saussele et al. | 318/138 |
| 3,369,381 | 2/1968 | Crane et al. | 68/12 |
| 3,488,566 | 1/1970 | Fukuda | 318/138 |
| 3,775,648 | 11/1973 | Brown et al. | 318/138 |
| 3,783,307 | 1/1974 | Breuer | 307/243 |
| 3,783,359 | 1/1974 | Malkiel | 318/254 |
| 3,794,895 | 2/1974 | Coupin et al. | 318/254 |
| 4,027,215 | 5/1977 | Knight et al. | 318/341 |
| 4,047,081 | 9/1977 | Liska | 318/138 |
| 4,051,417 | 9/1977 | Fujinawa et al. | 318/138 |
| 4,132,930 | 1/1979 | Schalk | 318/138 |
| 4,162,435 | 7/1979 | Wright | 318/138 |
| 4,167,692 | 9/1979 | Sekiya et al. | 318/138 |
| 4,169,990 | 10/1979 | Lerdman | 318/138 |
| 4,238,717 | 12/1980 | Knight et al. | 318/254 X |
| 4,250,435 | 2/1981 | Alley et al. | 318/138 |
| 4,250,544 | 2/1981 | Alley | 364/110 |
| 4,270,074 | 5/1981 | Duckworth et al. | 318/254 |
| 4,275,343 | 6/1981 | Fulton et al. | 318/721 |
| 4,282,464 | 8/1981 | Uzuka | 318/254 X |
| 4,292,573 | 9/1981 | Ebert et al. | 318/138 |
| 4,346,434 | 8/1982 | Morinaga | 364/183 |
| 4,368,411 | 1/1983 | Kidd | 318/254 |
| 4,409,526 | 10/1983 | Yamauchi et al. | 318/254 |
| 4,415,844 | 11/1983 | Mendenhall et al. | 318/254 |
| 4,429,262 | 1/1984 | Utenick | 318/254 |
| 4,479,078 | 10/1984 | Kidd et al. | 318/254 |
| 4,494,051 | 1/1985 | Bailey | 318/254 |

FOREIGN PATENT DOCUMENTS

| | | | |
|---|---|---|---|
| 1082302 | 7/1980 | Canada | 318/138 |
| 0071941 | 2/1983 | European Pat. Off. | 318/138 |
| 8300781 | 3/1983 | Int'l Pat. Institute | 318/138 |
| 5825038 | 3/1977 | Japan . | |
| 57-71258 | 5/1982 | Japan . | |
| 57-160385 | 10/1982 | Japan | 318/254 |

Primary Examiner—Charles D. Miller
Assistant Examiner—Bentsu Ro
Attorney, Agent, or Firm—Ralph E. Krisher, Jr.

[57] ABSTRACT

A control system for an electronically commutated DC motor having a rotatable assembly and a stationary assembly with a plurality of winding stages. The application of a DC voltage to the winding stages is controlled to provide an effective voltage thereto by commutating the winding stages to apply the DC voltage thereto in sequence to cause rotation of the rotatable assembly. A neutral conductor voltage of the motor is approximated and compared with the back emf of one of the winding stages to obtain an output representing the angular position of the rotatable assembly. The winding stages are commutated in response to this output when a predetermined angular position is reached. The DC voltage applied to the winding stages is pulse width modulated by alternately pulse width modulating first and second drive circuits. The first drive circuit associated with a winding stage which remains on after commutation is pulse width modulated until a predetermined time after commutation and then there is a shift to pulse width modulate the second drive circuit associated with the winding stage which will remain on after the next commutation.

A method of operating an electronically commutated motor and a laundering apparatus are also disclosed.

132 Claims, 13 Drawing Figures

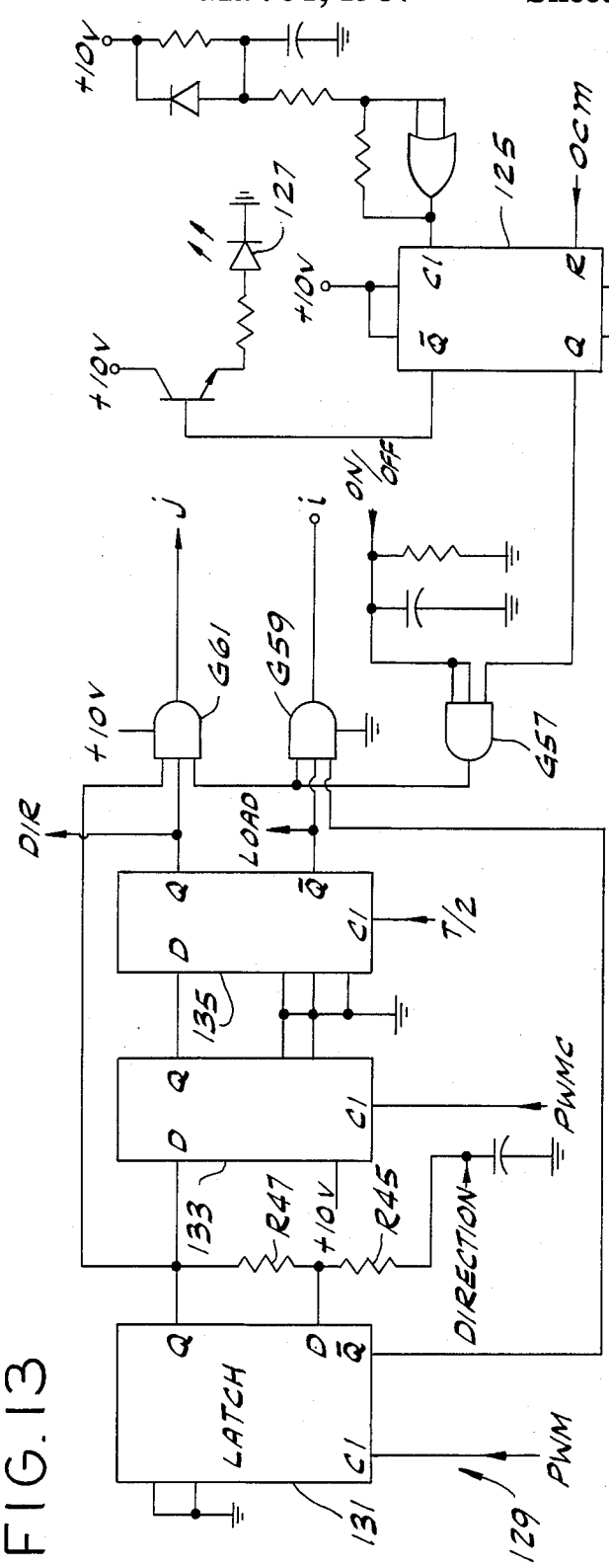
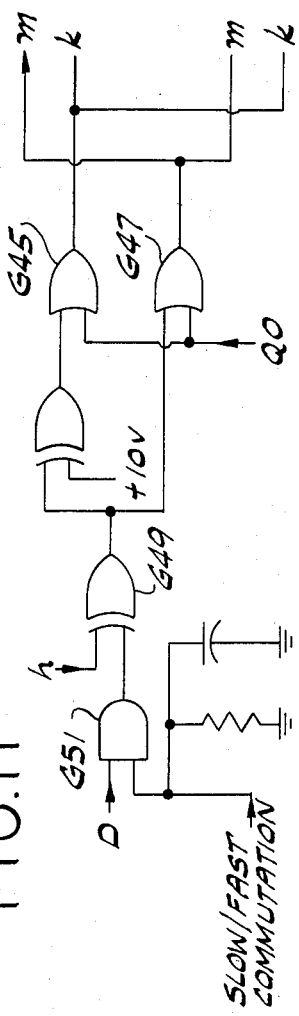
FIG. 13
FIG. 11

CONTROL SYSTEM, METHOD OF OPERATING AN ELECTRONICALLY COMMUTATED MOTOR, AND LAUNDERING APPARATUS

CROSS REFERENCE TO RELATED APPLICATIONS

This application is a continuation-in-part of copending application Ser. No. 412,421 filed Aug. 27, 1982 (now U.S. Pat. No. 4,449,079) which is a continuation of application Ser. No. 141,267 filed Apr. 17, 1980 (now abandoned) which was a continuation-in-part of application Ser. No. 077,656 filed Sept. 21, 1979 (now abandoned) which was a continuation-in-part of application Ser. No. 802,484 filed June 1, 1977 (now U.S. Pat. No. 4,169,990) which was a continuation-in-part of application Ser. No. 729,761 filed Oct. 5, 1976 (now abandoned) which was a continuation-in-part of application Ser. No. 482,409 filed June 24, 1974 (now U.S. Pat. No. 4,005,347). Each of the aforementioned applications which are commonly assigned are respectively incorporated by reference herein.

This application is also related to the following commonly assigned applications: John H. Boyd, Jr. application, Ser. No. 367,951, filed Apr. 13, 1982, now U.S. Pat. No. 4,528,485; Harold B. Harms and David M. Erdman application Ser. No. 400,319, filed July 21, 1982 (now U.S. Pat. No. 4,532,459); David M. Erdman applications Ser. No. 412,421, filed Aug. 27, 1982 (now U.S. Pat. No. 4,449,079) and Ser. No. 191,056, filed Sept. 25, 1980 (now U.S. Pat. No. 4,459,519); and Floyd H. Wright application Ser. No. 729,804, filed Oct. 5, 1976 (now U.S. Pat. No. 4,162,435). The entire disclosures of each of the foregoing applications and patents are specifically incorporated herein by reference.

FIELD OF THE INVENTION

This invention relates in general to dynamoelectric machines and domestic appliances and more particularly to a control system for an electronically commutated motor, a method of operating an electronically commutated motor, and a laundering apparatus.

BACKGROUND OF THE INVENTION

While conventional brush-commutated DC motors may have numerous advantageous characteristics such as convenience of changing operational speeds and direction of rotation, it is believed that there may be disadvantages such as brush wear, electrical noise or RF interference caused by sparking between the brushes and the segmented commutator, that may limit the applicability of such brush-commutated DC motors in some fields such as the domestic appliance field. Electronically commutated motors, such as brushless DC motors and permanent magnet motors with electronic commutation, have now been developed and generally are believed to have the above discussed advantageous characteristics of the brush-commutated DC motors without many of the disadvantages thereof while also having other important advantages. Such electronically commutated motors are disclosed in the David M. Erdman U.S. Pat. Nos. 4,005,347 and 4,169,990 and Floyd H. Wright U.S. Pat. No. 4,162,435. These electronically commutated motors may be advantageously employed in many different fields or motor applications among which are domestic appliances, e.g., automatic washing or laundry machines such as disclosed in the aforementioned co-pending U.S. patent applications, and in Ser. No. 077,784 filed Sept. 21, 1979 (now U.S. Pat. No. 4,327,302) and Ser. No. 141,268 filed Apr. 17, 1980 (now U.S. Pat. No. 4,390,826).

Laundry machines as there disclosed are believed to have many significant advantages over the prior art laundry machines which employ various types of transmissions and mechanisms to convert rotary motion into oscillatory motion to selectively actuate the machine in its agitation or washing mode and in its spin extraction mode, and such prior art laundry machines are believed to be more costly and/or complicated to manufacture, consume more energy, and require more servicing. Laundry machines with electronically commutated motors require no mechanical means, other than mere speed reducing means, to effect oscillatory action of the agitator, and in some applications the spin basket might be directly driven by such a motor. While the past control systems, such as those disclosed in the aforementioned coassigned applications for instance, undoubtedly illustrated many salient features, it is believed that the control systems for electronically commutated motors in general, and for such motors utilized in laundry machines, could be improved. In some of the past control systems, the position of the rotatable assembly (i.e., the rotor) of the electronically commutated motor was located by sensing the back emf of one of the winding stages on the stationary assembly (i.e, the stator) thereof with reference to a neutral conductor voltage of the motor. In some of the past electronically commutated motors, however, a neutral conductor may not have been readily available, so it is believed that a control system for these motors would be desirable. Some of the past control systems may have also included provision for starting an electronically commutated motor by supplying a rotating field to the rotor thereof by means of a voltage offset input to such control system. This offset was provided by an analog input, and it is believed to have introduced an offset error into the past control systems. Some of these past control systems also may have used an integrator to determine the angular position of the rotatable assembly of the past electronically commutated motors, which integrator was reset by an analog circuit after each commutation of such motors. Resetting the integrator using analog signals is believed to have required the use of components which may not advantageously lend themselves to subsequent application of integrated circuit technology to the entire control system. The above mentioned past control systems also may have lacked electronic circuit breaker and voltage regulation capabilities which are believed to be desirable features for a control system.

Some of the past control systems for electronically commutated motors, such as some of those shown in the patents and applications mentioned above for instance, used a pair of driving transistors, called upper and lower transistors, for each winding stage of such motors. In these past control systems, the upper transistors or the lower transistors, but not both, were pulse width modulated to control the electronically commutated motor speed. However, this is believed to have resulted in uneven usage of the drive transistors and affected the position sensing of such past control systems. It is believed that pulse width modulating the drive transistor associated with the winding stage of the electronically commutated motor which remains on after commutation, as opposed to the winding stage which was just turned on at the commutation, results in faster transfer of the winding current to the winding stage which was just commutated on and in less electrical noise in the back emf signal of the third winding stage after zero crossing of said back emf signal. It is also believed that this faster transfer of winding current is preferable in applications where motor current is being controlled or where the motor has a high inductance. However, it is further believed that previous control systems did not permit this faster transfer of winding current after each commutation.

In using electronically commutated motors in the laundering machine application, for example, it may be desirable to reverse the direction of rotation of the motor from time to time, such as when the machine is in the agitate mode, rather than use a heavy and expensive transmission. However, with some of the aforementioned past motor control systems, the act of reversing the motor is believed to have resulted in a momentary current surge through the drive transistors which may have undesirably heated the drive transistors. Moreover, it is desirable in the laundering machine application, among others, to operate the electronically commutated motor at two different speeds. However, it is believed that this may have led in some of the prior control systems to inaccuracies in the sensing of rotor position. For example, it is believed that a control system which integrated the back emf signal to obtain a rotor position signal might give different position results for low speed and high speed operation for the same actual rotor position.

SUMMARY OF THE INVENTION

Among the several objects of this invention may be noted the provision of an improved control system for an electronically commutated motor, an improved method of operating an electronically commutated motor, and an improved laundering apparatus which overcome at least some of the disadvantageous features of the prior art discussed above; the provision of an improved control system which has the ability to sense rotor position when there is no neutral conductor available from the motor; the provision of such a control system which digitally provides a rotating field to the rotor for starting of the motor without introducing an offset error; the provision of such a control system which digitally resets the rotor position sensing integrator after each commutation; the provision of such a control system which digitally shuts off power to the winding stages when a predetermined maximum current level is exceeded and keeps the power thereto shut off until a resetting signal occurs such as when the system is manually reset; the provision of such a control system which regulates the effective voltage and current to the winding stages; the provision of such a control system which provides even usage of the drive transistors; the provision of such a control system having improved rotor position sensing; and the provision of such a control system having improved switching characteristics in changing direction of rotation; the provision of an improved method of operating an electronically commutated motor which includes sensing rotor position when there is no neutral conductor available from the motor; the provision of such an improved method which includes digitally resetting the rotor position sensor after each commutation; the provision of such an improved method which includes digitally shutting off power to the winding stages when a predetermined maximum current level is exceeded and keeping the power thereto shut off until the system is manually reset; and the provision of such an improved method which provides even usage of the drive transistors; the provision of an improved laundering apparatus which accurately controls rotation during low speed and high speed operation; the provision of such a laundering apparatus which provides even usage of electronic components; and the provision of such a laundering apparatus having improved switching characteristics in changing direction of rotation. These as well as other objects and advantageous features of the present invention will be in part apparent and in part pointed out hereinafter.

In general, one form of a control system for an electronically commutated motor having a rotatable assembly and a stationary assembly with a plurality of winding stages comprises means for controlling the application of a DC voltage to provide a resultant effective voltage to the winding stages, the controlling means including means for commutating the winding stages by applying the DC voltage thereto in sequence to cause rotation of the rotatable assembly. Means for approximating a neutral conductor voltage for said motor and means for comparing the approximated neutral conductor voltage with the terminal voltage of one of the winding stages are also included. The approximating means has outputs corresponding to each of a plurality of pairs of the winding stages, the voltage on each output being a function of the sum of the terminal voltages of its corresponding pair of winding stages. The output of the comparing means represents the angular position of the rotatable assembly and the controlling means is responsive to the output of the comparing means to cause the commutating means to commutate the winding stages when the rotatable assembly reaches a predetermined angular position.

Generally, yet another form of control system for an electronically commutated motor having a rotatable assembly and a stationary assembly with a plurality of winding stages includes a circuit for commutating the winding stages by applying a DC voltage thereto in at least one preselected sequence to cause rotation of the rotatable assembly. Another circuit is connected to the commutating circuit for pulse width modulating the DC voltage so that the DC voltage is applied by the commutating circuit in voltage pulses having a predetermined maximum duty cycle. A further circuit is connected to the pulse width modulating circuit for repeatedly integrating the DC voltage over the width of each of the voltage pulses and truncating each of the voltage pulses upon the integration reaching a predetermined level, the integrating circuit being reset before each voltage pulse.

In general, an additional form of control system for an electronically commutated motor having a rotatable assembly and a stationary assembly with a plurality of winding stages includes a circuit responsive to a set of control signals for commutating the winding stages by applying a DC voltage thereto in at least one preselected sequence to cause rotation of the rotatable assembly. Another circuit, which is responsive to a back emf signal indicative of the back emf condition of at least one winding stage, produces a commutation signal indicative of a predetermined angular position of the rotatable assembly. A control signal circuit responsive to the commutation signal provides the set of control signals to the commutating circuit to commutate the winding stages when the rotatable assembly reaches the predetermined angular position. The control signal circuit includes a circuit for inhibiting the operation of the commutation signal producing circuit for first lengths of time after corresponding occurrences of the commutation signal so that the first lengths of time are approximately a predetermined fraction of respective varying lengths of time between successive commutations. In this way, commutation currents are prevented from affecting the commutation signal producing circuit.

Generally, a still further form of control system for an electronically commutated motor having a rotatable assembly and a stationary assembly with a plurality of winding stages includes circuitry responsive to a set of control signals for commutating the winding stages by applying a DC voltage thereto in at least one preselected sequence to cause rotation of the rotatable assembly. Another circuit senses the angular position of the rotatable assembly and provides a commutation signal indicative of a predetermined angular position of the rotatable assembly. A control signal circuit is responsive to the position sensing and commutation signal providing circuit for generating the set of control signals for the commutating circuitry to commutate the winding stages when the rotatable assembly reaches the predetermined angular position. A further circuit is included for inhibiting the control signal circuit to prevent the generation of the set of control signals when the motor current exceeds a predetermined maximum value, the inhibiting circuit maintaining the inhibition of the control signal circuit until a resetting signal occurs such as when it is manually reset.

Further, in general another form of a control system for such an electronically commutated motor comprises means responsive to a set of control signals for commutating the winding stages by applying a DC voltage thereto in sequence to cause rotation of the rotatable assembly. Each winding stage has at least two terminals, one of which is commonly connected to one terminal of each of the other winding stages and the DC voltage is applied to pairs of other terminals of the winding stages in sequence. Logic means responsive to a signal representative of the angular position of the rotatable assembly supply the control signals to the commutating means in a sequence in which for each commutation one of the winding stages which was energized before commutation remains energized after commutation and the other winding stage which was energized before commutation becomes deenergized after commutation. Each winding stage remains energized through two successive commutations unique to it and then becomes deenergized. The direction of current flow in the winding stage which remains energized after commutation is the same as the direction of current flow in that winding stage before commutation. The control system in its various forms further includes means for pulse width modulating upon commutation the control signal associated with the winding stage which remained energized, or for shifting the pulse width modulation between winding stages at any time relative to commutation.

In general, a further additional form of control system for an electronically commutated, two-speed motor having a rotatable assembly and a stationary assembly with a plurality of winding stages, includes circuitry responsive to a set of control signals for commutating the winding stages by applying a DC voltage thereto in at least one preselected sequence to cause rotation of the rotatable assembly. Another circuit senses a back emf signal indicative of the back emf condition of at least one winding. An integrating circuit integrates a portion of the back emf signal and produces a commutation signal indicative of a predetermined angular position of the rotatable assembly. A control signal circuit is responsive to the commutation signal for providing the set of control signals to the commutating circuitry to commutate the winding stages when the rotatable assembly reaches the predetermined angular position. A further circuit is responsive to a speed control signal for providing two different time constants for the integrating circuit corresponding to the two speeds of the motor.

Also, in general a form of laundering apparatus comprises a rotatable component, an electronically commutated motor including a rotatable assembly for driving the rotatable component and a stationary assembly with a plurality of winding stages. A control system is connected to said motor, and means are provided for applying a DC voltage to the control system. The control system includes means for controlling the application of the DC voltage to provide a resultant effective voltage to the winding stages. The controlling means includes means for commutating the winding stages by applying the DC voltage thereto in sequence to cause rotation of the rotatable assembly, thereby to cause rotation of the rotatable component. The control system further includes means for approximating a neutral conductor voltage for said motor, and means for comparing the approximated neutral conductor voltage with the back emf of one of the winding stages. The approximating means has outputs for each of a plurality of pairs of the winding stages, the voltage on each output being a function of the sum of the terminal voltages of its associated pair of winding stages. The output of the comparing means represents the angular position of the rotatable assembly. The controlling means further includes means responsive to the output of the comparing means to cause the commutating means to commutate the winding stages when the rotatable assembly reaches a predetermined angular position.

Additionally, in general a form of laundering apparatus comprises a rotatable component, an electronically commutated motor including a rotatable assembly for driving the rotatable component and a stationary assembly with a plurality of winding stages. A control system is connected to said motor and means is provided for supplying a DC voltage to the control system. The control system includes means responsive to a set of control signals for commutating the winding stages by applying the DC voltage thereto in sequence to cause rotation of the rotatable assembly. Each winding stage has at least two terminals, one of which is commonly connected to one terminal of each of the other winding stages and the DC voltage is applied to pairs of other terminals of the winding stages in sequence. Logic means responsive to a signal representative of the angular position of the rotatable assembly supply the control signals to the commutating means in a sequence in which for each commutation one of the winding stages which was energized before commutation remains energized after commutation and the other winding stage which was energized before commutation becomes deenergized after commutation.

Each winding stage remains energized through two successive commutations unique to it and then becomes deenergized. The direction of current flow in the winding stage which remains energized after commutation is the same as the direction of current flow in that winding stage before commutation. The control system further includes means for pulse width modulating the control signal associated with the winding stage which was commutated on until a time after commutation and for shifting at that time to pulse width modulate the control signal associated with the winding stage which will be deenergized after the next commutation.

Also, in general a method of operating an electronically commutated motor with the motor having a rotatable assembly and a stationary assembly with a plurality of winding stages comprises the steps of commutating the winding stages by applying a DC voltage thereto in sequence to cause rotation of the rotatable assembly, and approximating a neutral conductor voltage for said motor at outputs corresponding to each of a plurality of pairs of the winding stages, the voltage on each of the outputs being a function of the sum of the terminal voltages of its corresponding pair of winding stages. The approximated neutral conductor voltage is compared with the terminal voltage of one of said winding stages, the result of the comparison representing the angular position of the rotatable assembly. The commutation of the winding stages occurs when the rotatable assembly reaches a predetermined angular position.

Further in general, a method of operating such an electronically commutated motor comprises commutating the winding stages in response to a set of control signals by applying a DC voltage thereto in sequence to cause rotation of the rotatable assembly. Each winding stage has at least two terminals, one of which is commonly connected to one terminal of each of the other winding stages and the DC voltage is applied to pairs of other terminals of the winding stages in sequence. The control signals are supplied in a sequence in which for each commutation one of the winding stages which was energized before commutation remains energized after commutation and the other winding stage which was energized before commutation becomes deenergized after commutation. Each winding stage remains energized through two successive commutations unique to it and then becomes deenergized. The direction of current flow in the winding stage which remains energized after commutation is the same as the direction of current flow in that winding stage before commutation. The control signal associated with the winding stage which was commutated on is pulse width modulated until a time after commutation. Then the pulse width modulation is shifted at that time to the control signal associated with the winding stage which will be deenergized after the next commutation.

Also, in general a method of operating such an electronically commutated motor comprises commutating the winding stages in response to a set of control signals by applying a DC voltage thereto in sequence to cause rotation of the rotatable assembly. Each winding stage has at least two terminals, one of which is commonly connected to one terminal of each of the other winding stages and the DC voltage is applied to pairs of winding stages in sequence. Each winding stage has associated therewith a first drive circuit for allowing the flow of current through its associated winding stage in a first direction in response to a first one of the control signals and a second drive circuit for allowing the flow of current through its associated winding stage in the opposite direction in response to a second one of the control signals. The control signals are supplied in a sequence in which for each commutation one of the winding stages which was energized before commutation remains energized after commutation and the other winding stage which was energized before commutation becomes deenergized after commutation. Each winding stage remains energized through two successive commutations unique to it and then becomes deenergized. The direction of current flow in the winding stage which remains energized after commutation is the same as the direction of current flow in that winding stage before commutation. Upon commutation the control signal associated with the winding stage which remains energized is pulse width modulated by generating a drive selection signal every other commutation and in response to a first state of the drive selection signal shifting from modulating the control signals for the first drive circuit to modulating the control signals for the second drive circuit upon commutation and in response to a second state of the drive selection signal shifting from modulating the control signals for the second drive circuit to modulating the control signals for the first drive circuit upon commutation.

BRIEF DESCRIPTION OF THE DRAWINGS

FIG. 11 is a schematic diagram of commutation mode control circuitry of the control system of this invention;

FIG. 13 is a schematic diagram of protective circuitry of the control system of this invention.

Corresponding reference characters refer to corresponding parts throughout the several views of the drawings.

The exemplifications set out herein illustrate preferred embodiments of the invention in one form thereof, and such exemplifications are not to be construed as limiting the scope of the invention in any manner.

DETAILED DESCRIPTION OF THE PREFERRED EMBODIMENT

Figure 1:
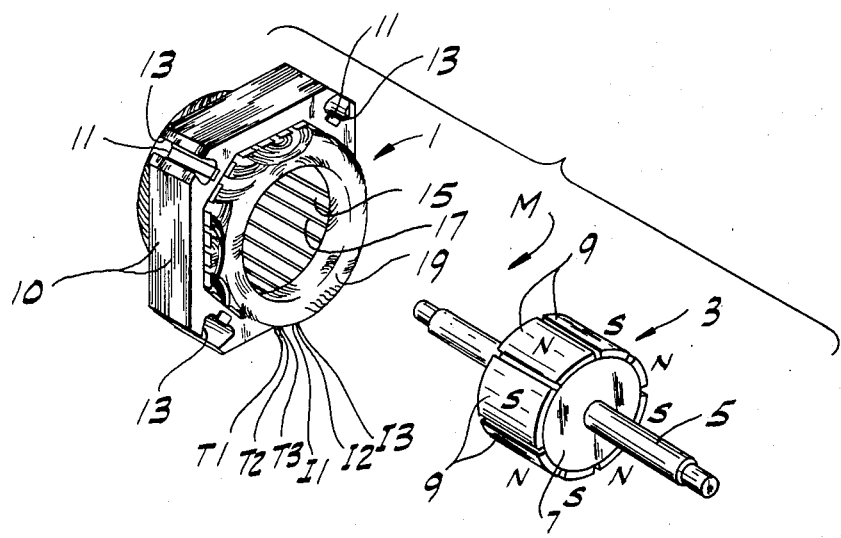
FIG. 1 is an exploded, perspective view of the main elements of an electronically commutated DC motor which is controllable by the control system of the present invention.

Referring now to the drawings, and more particularly to FIG. 1, an electronically commutated motor M, such as a brushless DC motor or the like for instance, is shown having a stationary assembly including a stator or core 1 and a rotatable assembly including a permanent magnet rotor 3 and a shaft 5. Rotor 3 is mounted on shaft 5 journaled for rotation in conventional bearings in end shields (not shown) of the stationary assembly with the rotor being rotatable within the bore of stator 1. The rotor comprises a ferromagnetic core 7 constituted by a number of thin flat circular ferromagnetic laminations secured together and to shaft 5. Eight essentially identical magnetic material elements or relatively thin arcuate segments 9 of permanent magnet material (e.g., ceramic type or cobalt samarium, Alnico, etc.), each providing a relatively constant flux field, are secured, for example, by adhesive bonding to rotor core 7. The segments each span somewhat less than 45 mechanical degrees and are magnetized to be polarized radially in relation to the rotor core with adjacent segments being alternately polarized as indicated. While magnets 9 on rotor 3 are illustrated for purposes of disclosure, it is contemplated that other rotors having different constructions and other magnets different in both number, construction, and flux fields may be utilized with such other rotors within the scope of the invention so as to meet at least some of the objects thereof.

Stator 1 also may be fabricated of thin ferromagnetic laminations 10, as is conventional in the AC motor art, which are held together by four retainer clips 11, one positioned in each corner notch 13 of the stator core. Alternatively, the stator core laminations may be held together by suitable means, such as for instance welding or adhesively bonding, or merely held together by the windings, all as will be understood by those skilled in this art. Twenty-four inwardly directed teeth 15 define the stator bore and twenty-four axial slots 17 within which windings 19 are disposed for establishing eight stator poles. The winding end turns extend beyond the stator end faces and the winding terminal ends or leads are brought out and connected separately to a control system. While stator 1 is illustrated for purposes of disclosure, it is contemplated that other stators of various other constructions having different shapes and with different numbers of teeth and slots may be utilized within the scope of the invention so as to meet at least some of the objects thereof.

Figure 2:
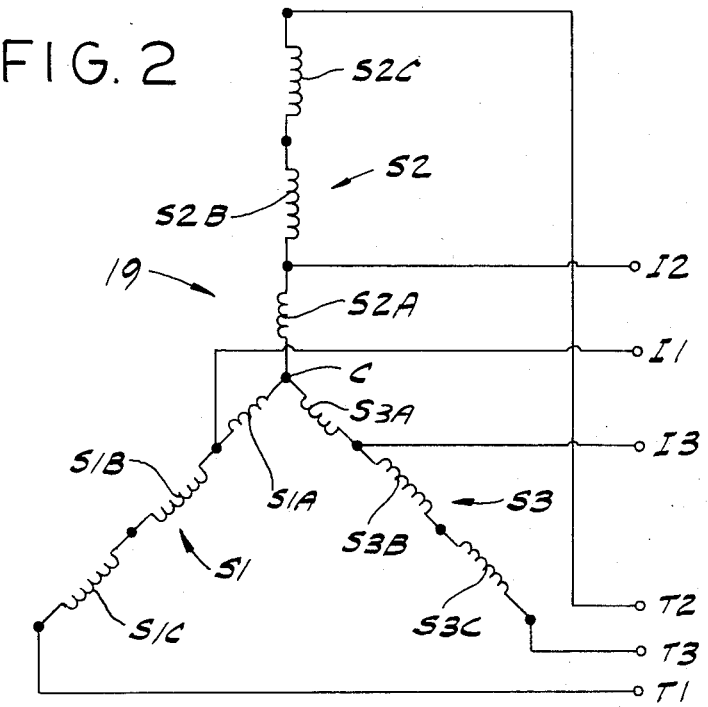
FIG. 2 is a schematic diagram showing the winding stages and terminals of the motor of FIG. 1.

Electronically commutated DC motor M as described herein merely for purposes of disclosure is a three-stage, eight-pole motor, but it will be understood that the ECM of this invention may be of 2, 4, 6, etc. pole construction and have 2, 3, 4 or more winding stages within the scope of the invention so as to meet at least some of the objects thereof. FIG. 2 shows schematically a multi-stage winding arrangement of stator winding 19 having three winding stages S1, S2, and S3 each made up of three sets of coils S1A-S1C, S2A-S2C, and S3A-S3C each of which is constituted by a preselected number of winding turns of an electrical conductor. Each winding stage has an end terminal T1, T2, and T3, respectively, and an intermediate tap I1, I2, and I3, respectively. Thus, it may be noted that coil sets S1A, S2A and S3A define tapped sections of the winding stages, respectively. The other end terminals of each of the winding stages are commonly connected at C.

While winding stages S1, S2 and S3 are illustrated herein as having three coil sets, end terminals and intermediate taps for purposes of disclosure, it is contemplated that at least one winding stage, any number of coil sets, end terminals and intermediate taps may be utilized within the scope of the invention so as to meet at least some of the objects thereof.

It can be seen that when the winding stages are energized in a temporal sequence three sets of eight magnetic poles are established that will provide a radial magnetic field which moves clockwise or counterclockwise around the stator bore depending on the preselected sequence or order in which the stages are energized. This moving field intersects with the flux field of the permanent magnet rotor poles 9 to cause the rotor 3 to rotate relative to the stator 1 in the desired direction to develop a torque which is a direct function of the intensities or strengths of the magnetic fields. If a more detailed description of the construction of electronically commutated motor M is desired, reference may be had to the aforementioned John H. Boyd, Jr. application Ser. No. 367,951 filed Apr. 13, 1982, now U.S. Pat. No. 4,528,485.

The winding stages of motor M, as will become apparent, are commutated without brushes by sensing the rotational position of the rotatable assembly or rotor 3 as it rotates within the bore of stator 1 and utilizing electrical signals generated as a function of the rotational position of the rotor sequentially to apply a DC voltage to each of the winding stages in different preselected orders or sequences that determine the direction of the rotation of the rotor. Position sensing may be accomplished by a position-detecting circuit responsive to the back emf of the ECM to provide a simulated signal indicative of the rotational position of the motor to control the timed sequential application of voltage to the winding stages of the motor. Other means of position sensing may also be used.

Figure 3:
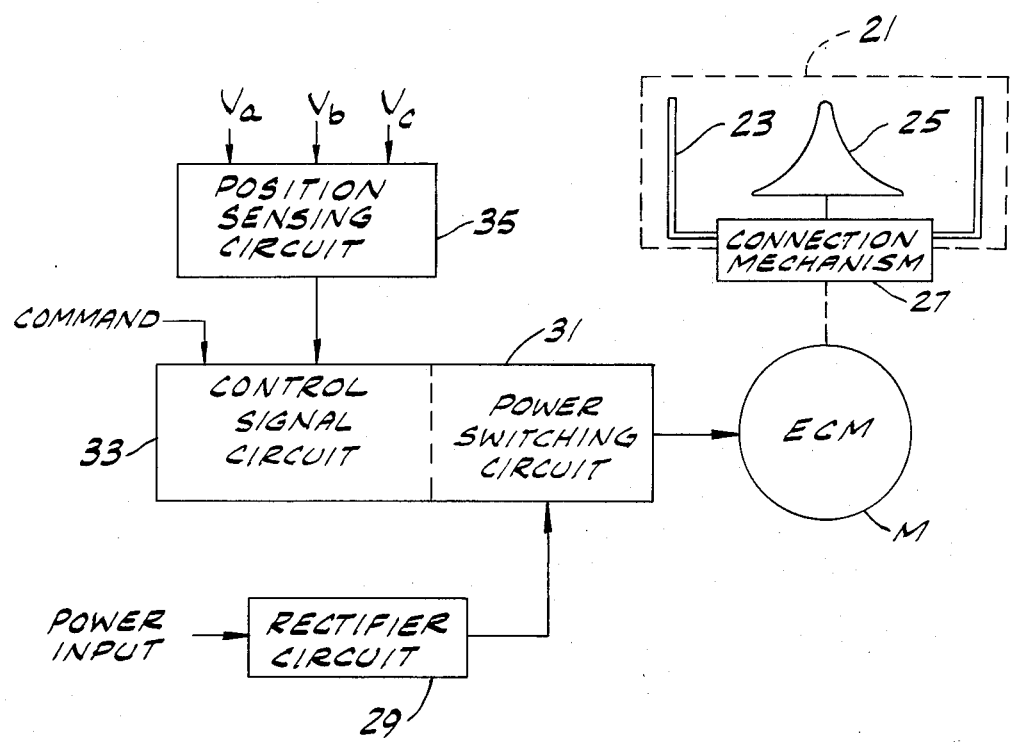
FIG. 3 is a block-diagrammatic schematic showing the major components of the control system of this invention in combination with an electronically commutated motor in laundry apparatus of the invention.

FIG. 3 illustrates schematically a laundry machine 21 in one form of the invention which includes motor M and the drive therefor also in one form of the invention. Machine 21 comprises a basket 23 which is rotatable within a tub (not shown) which holds the water for washing the fabrics to be laundered, and a coaxially mounted agitator 25, both of which are rotatable independently or jointly about their common axis. Agitator 25 and basket 23 together comprise means for agitating water and fabrics to be laundered thereby to wash them and for thereafter spinning the fabrics to effect centrifugal displacement of water therefrom. Motor M is coupled selectively to the agitator alone during the wash cycle or mode and to both the basket and the agitator in the spin cycle through a connection mechanism 27 which may comprise a fixed ratio speed reducer, such as a gear box or a pulley arrangement for instance, or in some applications the shaft 5 of motor M could be directly coupled to the agitator and the basket. Mechanism 27 therefore comprises means for driving the agitating and spinning means. Power supplied from a 115 V 60 Hz AC line is rectified by a rectifier circuit 29 which defines a DC power source and applied to a power switching circuit 31 which constitutes means for controlling the application of the DC voltage to the winding stages to provide a resultant effective voltage thereto. Power switching circuit 31 is responsive to a set of control signals from a control signal circuit 33 to commutate the winding stages by applying the DC voltage thereto in at least one preselected sequence to cause rotation of the rotor 3. The motion of rotor 3 is selectively coupled as discussed above to at least one rotatable component of the laundry machine 21, namely basket 23, agitator 25 or both, to cause rotation of the rotatable component. The set of control signals of control signal circuit 33 are a function of rotor position—which is derived from a position sensing circuit 35—and selected conditions and parameters, such as applied voltage (as represented in part by an applied command signal).

Power switching circuit 31 (see FIG. 4) includes a drive circuit for each winding stage labelled 37a, 37b, 37c respectively. Because these drive circuits are identical, only circuit 37a, the drive circuit for winding stage S1, is shown in detail. Each drive circuit includes first drive means 39 for allowing the flow of current through its associated winding stage in a first direction in response to a logic High control signal from circuit 33. Specifically, first drive means 39 includes an NPN input transistor Q1 whose base terminal B1 is connected to the control signal circuit to receive said control signal. The emitter of transistor Q1 is connected through a resistor to ground while its collector is connected through a diode D1 to the base of a PNP voltage-level-shifting transistor Q3 and through a diode D3 to the base of a high gain device 41 shown as a Darlington amplifier. Diodes D1 and D3 are believed to speed up the switching action of the first drive means. A pair of resistors R1, R3 are also connected to high gain device 41 to improve the switching characteristics. The collector of device 41 is connected to a line 43 which is connected through a transient suppressing inductor L1 to the positive output of rectifier circuit 29, and the emitter of device 41 is connected through a diode D5 to a pair of terminals I1a and T1a. When the motor is operated in the high speed mode, terminal I1a is connected via an electronically controlled switch to intermediate terminal I1 of the motor, whereas when the motor is operated in the low speed mode, terminal T1a is connected to terminal T1 of the motor. Thus, it can be seen that a logic High control signal on the base of transistor Q1 causes the positive voltage from rectifier circuit 29 to be applied to terminal T1 or I1 of the motor, depending upon the desired speed of the motor. First drive means 39 also includes a diode D7 to provide a discharge path for the winding currents when winding stage S1 is switched off.

Drive circuit 37a also includes second drive means 45 for allowing the flow of current through winding stage S1 in the opposite direction of that allowed by the first drive means in response to a second logic High control signal from control signal circuit 33. Second drive means 45 includes an NPN transistor Q5 whose base terminal B3 is connected to circuit 33 to receive the second control signal. In the embodiment shown in solid lines, the collector of transistor Q5 is connected through a resistor R7 to line 43 (the positive side of the power switching circuit), and its emitter is connected through another resistor to ground. In this embodiment an input signal at terminal B3 of less than five volts can drive the circuit. The collector of transistor Q5 is also connected through a PNP voltage-level-shifting transistor Q7 and a diode D9 to the base input of a three-stage high gain device 47. The collector of device 47 is connected through a diode D11 to the collector of transistor Q7 and through a diode D13 to terminals I1a and T1a. Diode D13 prevents a surge of current through device 47 when device 41 is turned on. The emitter of device 47 is connected to ground. A logic High control signal on terminal B3 results in device 47 being thrown into conduction and terminal T1a or I1a, as desired, being at ground potential. This causes current to flow through winding stage S1 in the opposite direction of the current flow when terminal B1 of the first drive means is at a logic High. In another embodiment of the second drive means, that shown with dashed lines in FIG. 4, resistor R7 is shunted and the emitter of transistor Q5 is connected through its emitter resistor to the collector of transistor Q7 instead of to ground. This embodiment requires control signals of at least five or six volts to control the second drive means.

Drive circuits 37b and 37c, for driving winding stages S2 and S3 respectively, are identical in all respects to drive circuit 37a. The input terminals for these latter drive circuits are labelled B5, B7 and B9, B11 respectively, and the output terminals are labelled T2a, I2a and T3a, I3a respectively. As will become apparent, the control signals from circuit 33 are applied to the drive circuits in such a manner that only the first drive means for one winding stage and the second drive means for another winding stage are driving their respective winding stages at any one time. This insures that current flows through a pair of series connected winding stages to generate the stator's magnetic field.

Figure 4:
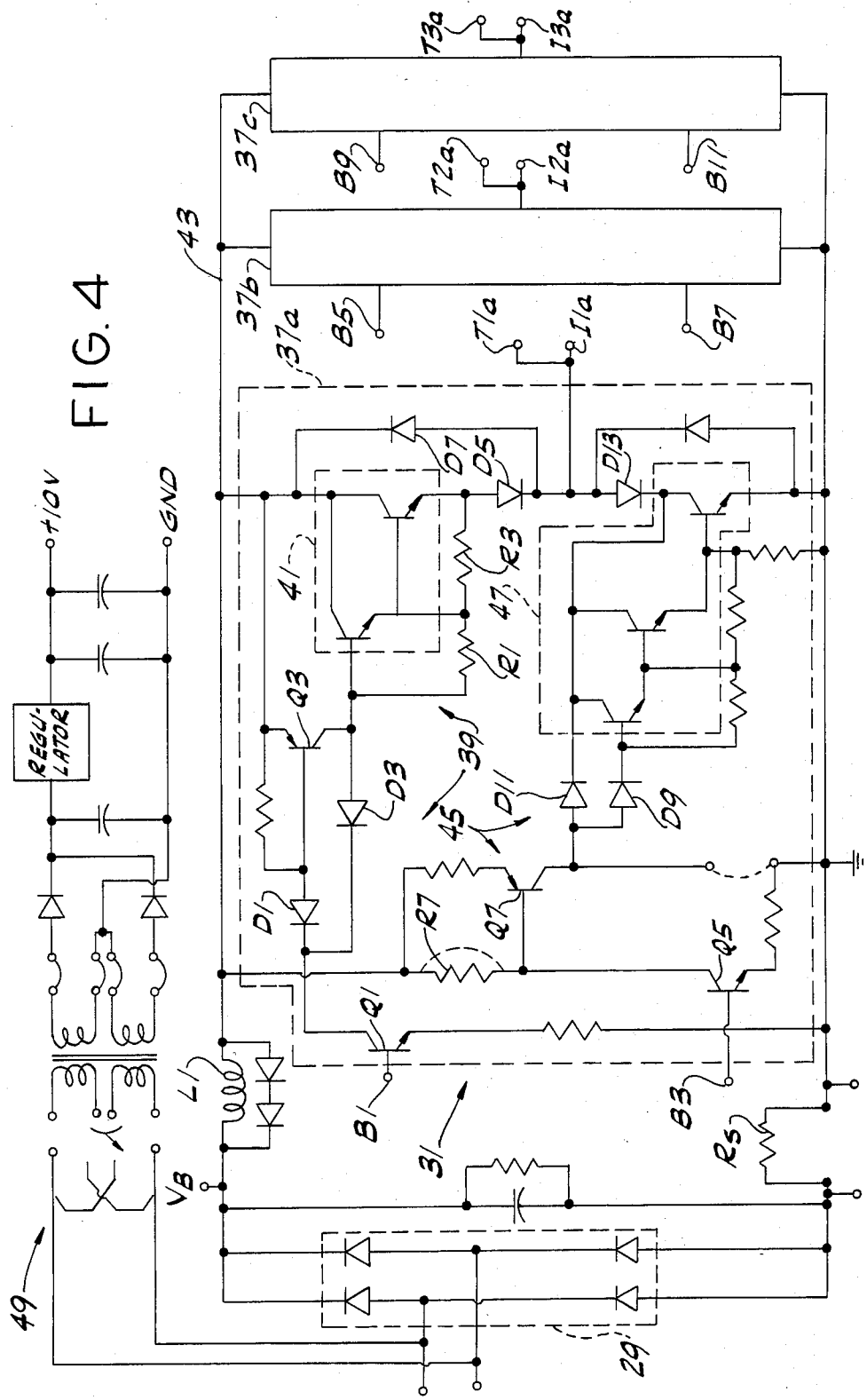
FIG. 4 is a schematic diagram showing the drive circuits for the motor of FIG. 1 and the power supply for the control system of this invention.

Also shown on FIG. 4 is a ten-volt regulated power supply 49 for supplying DC power to the circuitry at that voltage level.

Figure 5:
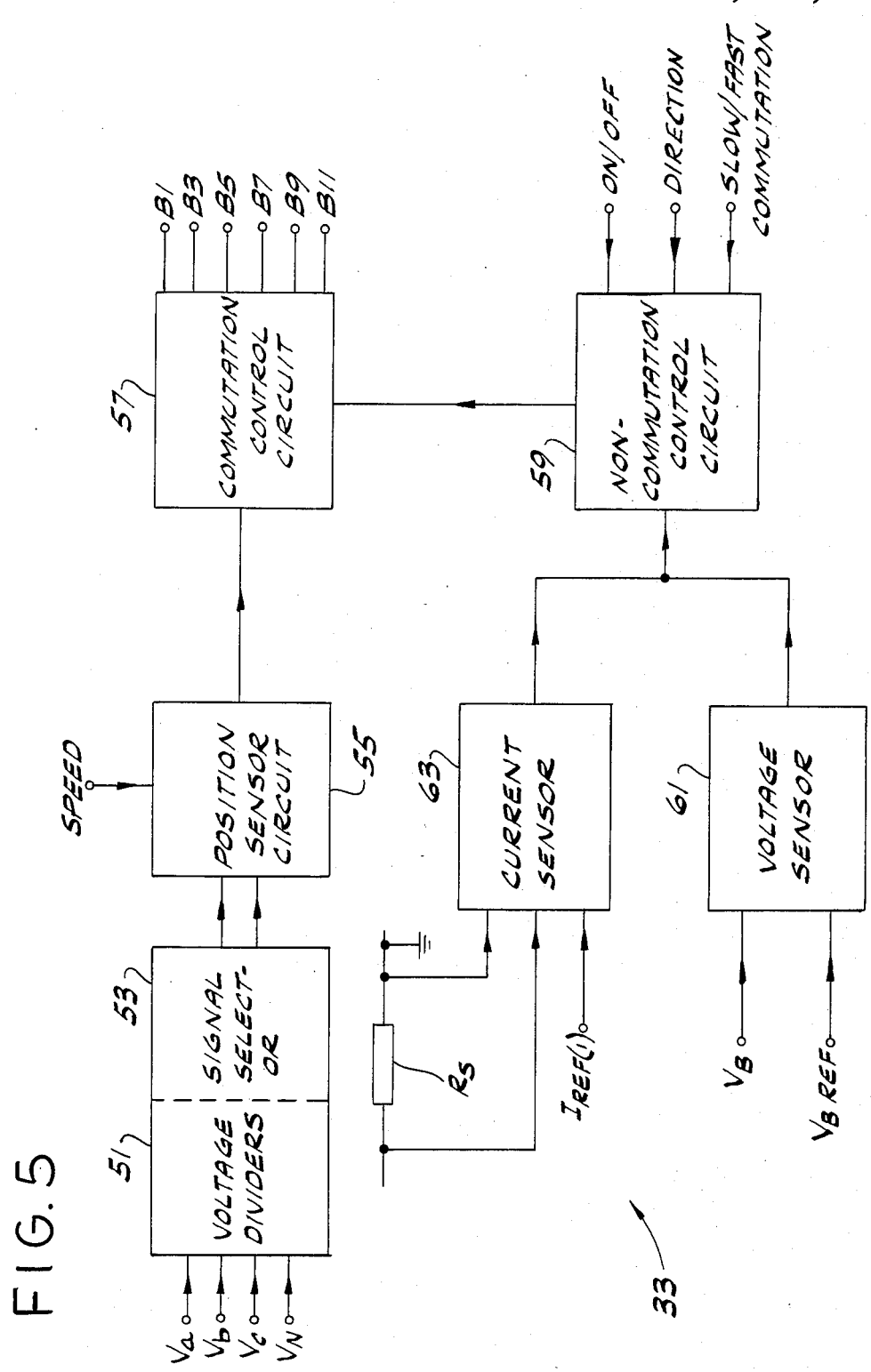
FIG. 5 is a block diagram showing in greater detail than FIG. 3 the major components of the control system of this invention.

Control signal circuit 33 (see FIG. 5) includes a set of voltage dividers 51 for approximating a neutral conductor voltage for the motor (in those cases in which a neutral conductor from the motor is not readily available) and for sensing the back emf of the motor. The particular outputs of the voltage dividers needed at any particular time (one approximated neutral voltage and one back emf) are selected by a signal selector 53, which is responsive to the system's particular place in the commutation sequence at that time to supply the desired outputs of the voltage dividers to a position sensor circuit 55 which also has a control input representative of the desired speed (High or Low) of the motor. The position sensor circuit supplies a signal indicative of the angular position of the rotor to a commutation control circuit 57 whose outputs are connected to the input terminals of driver circuits 37a, 37b and 37c. Upon the rotor reaching a predetermined angular position, the commutation control circuit changes the control signals which are supplied to the driver circuit to commutate the winding stages. The commutation control circuit also has an input from a non-commutation control circuit 59 which input represents a number of external commands such as an ON/OFF signal, a direction of rotation signal, and a slow/fast commutation signal. It is believed that pulse width modulating the drive circuit associated with the winding stage which has just been commutated on results in slower transfer of winding current to that winding stage than pulse width modulating the drive circuit associated with the winding stage which was on before commutation and remains on thereafter. The former process is called slow commutation while the latter is called fast commutation. The slow/fast commutation external command signal determines which commutation mode control signal circuit 33 operates in. The non-commutation control circuit is also responsive to an applied voltage sensor circuit 61 and a motor current sensor circuit 63 to inhibit the control signals when predetermined voltage and current levels are exceeded, the predetermined voltage level being $V_{BREF}$ and the predetermined current level being $I_{REF(1)}$. The actual applied voltage, $V_B$, is measured at the output of rectifier circuit 29 (FIG. 4) and the motor current is measured across a shunt resistor $R_s$ (FIGS. 4 and 5).

Figure 6:
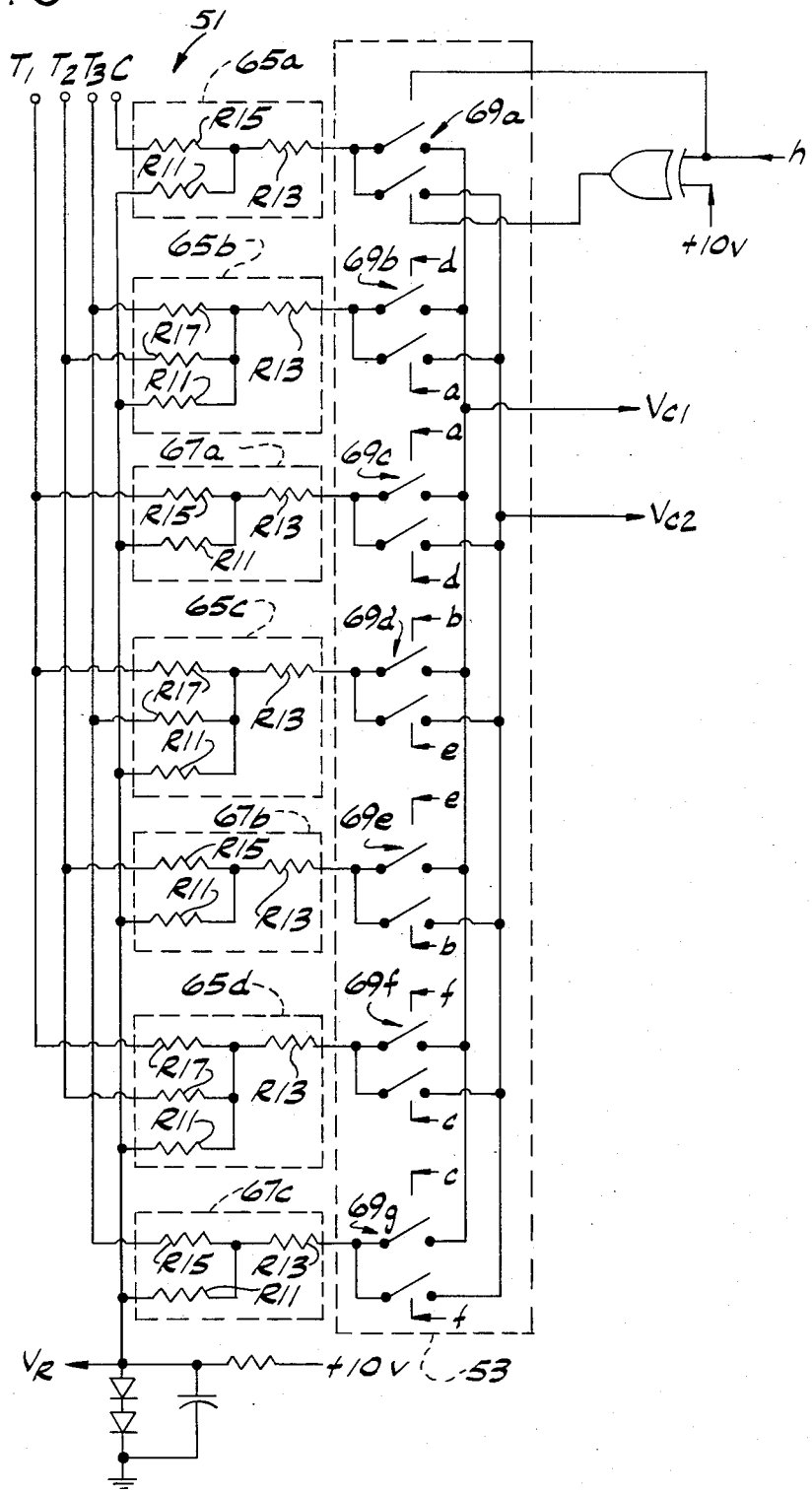
FIG. 6 is a schematic diagram showing back emf sensing and neutral approximating circuitry of the control system of this invention.

Voltage dividers 51 (see FIG. 6) are arranged to operate either with the common point C of the motor available or without. The voltage dividers have three input terminals connected to the motor taps T1, T2 and T3 of motor M (or to intermediate terminals I1, I2 and I3 during High speed operation). The common point C is also connected to an input of the voltage dividers, if available. The voltage dividers are divided into two sets. One, labelled 65a, 65b, 65c, and 65d provides the actual motor common voltage (if available) to the signal selector 53 or else approximates the neutral conductor voltage and supplies the approximated voltage to the signal selector. Dividers 65a–65d include a divider 65a for providing the motor common voltage, if available, to the signal selector; a divider 65b for approximating the neutral conductor voltage when winding stages S2 and S3 are energized; a voltage divider 65c for approximating the neutral conductor voltage when winding stages S1 and S3 are energized; and a voltage divider 65d for approximating the neutral conductor voltage when winding stages S1 and S2 are energized. The other set of voltage dividers, labelled 67a, 67b and 67c, provide the back emf of winding stages S1, S2 and S3 respectively to the signal selector. At the bottom of voltage dividers 51 is a circuit for generating a 1.5 V reference voltage $V_R$ which is used to insure that the integrated circuits making up the control system do not have a negative voltage applied to them. This reference voltage is accordingly applied to all the voltage dividers through 1K resistors labelled R11. The particular value of the resistors, and in fact all component values in the circuitry shown herein, could be changed as required or desired without being outside the scope of the present invention. The voltage dividers all have 10K output resistors R13 and dividers 65a, 67a, 67b and 67c also have 40K input resistors labeled R15. The remaining input resistors for dividers 65b, 65c and 65d are pairs of 80K resistors labeled R17.

Signal selector 53 includes a plurality of electronically controlled switches 69a–69g, the latter six of which are controlled by a set of six command signals a–f discussed below. Command signals a–f are mutually exclusive in that when any one is at a logic High all the others are at a logic Low. The High command signal uniquely identifies the particular part of the commutation sequence the system is in at that time. The electronically controlled switches each include two separately actuable switches, one of which is connected to a signal selector output labelled $V_{C1}$ and the other of which is connected to a signal selector output labelled $V_{C2}$. When command signal "a" is High, neutral approximating voltage divider 65b is connected through electronically controlled switch 69b to output $V_{C2}$ and back emf voltage divider 67a is connected through electronically controlled switch 69c to output $V_{C1}$. Thus, the voltage across terminals $V_{C1}$ and $V_{C2}$ when command signal "a" is High represents the difference between the back emf from winding stage S1 and the approximated neutral voltage obtained by summing the terminal voltages of windings S2 and S3. Similarly, when command signal "b" is High, the voltage across terminals $V_{C1}$ and $V_{C2}$ represents the difference between the back emf from winding S2 and the approximated neutral voltage obtained by summing in voltage divider 65c the terminal voltages of windings S1 and S3.

For convenience the meaning of the signals present on output terminals $V_{C1}$ and $V_{C2}$ is presented below for each command signal.

| Command Signal | Signal on VC1 | Signal on VC2 |
|---|---|---|
| a | Back emf of winding stage S1 | Approximated neutral from summing terminal voltages of stages S2 and S3 |
| b | Approximated neutral from summing terminal voltages of stages S1 and S3 | Back emf of stage S2 |
| c | Back emf of stage S3 | Approximated neutral from summing terminal voltages of stages S1 and S2 |
| d | Approximated neutral from summing terminal voltages of stages S2 and S3 | Back emf of winding stage S1 |
| e | Back emf of stage S2 | Approximated neutral from summing terminal voltages of stages S1 and S3 |
| f | Approximated neutral from summing terminal voltages of stages S1 and S2 | Back emf of winding stage S3 |

The back emf of winding S1 when command signal "a" is High has the opposite polarity of the back emf of winding S1 when command signal "d" is High because the direction of current flow through winding stages S2 and S3 is in one direction for a High command signal "a" and in the other direction for a High command signal "b". This also occurs for the other pairs of command signals, namely c–f and b–e. Because of this polarity reversal, the signal selector switches cause the back emf signal for each winding to be applied to either output terminal $V_{C1}$ and $V_{C2}$ as necessary to ensure the proper polarity of the voltage across the terminals.

A similar polarity reversal is accomplished by electronically controlled switch 69a, which has separately switchable switch units connected to output terminals $V_{C1}$ and $V_{C2}$. A command signal "h", described below, which goes High every other commutation, is applied to one control input of switch 69a while its complement is supplied to the other control input of the switch. This ensures, when the common of the motor is available, that the proper polarity of the back emf with respect to the neutral voltage is maintained across terminals $V_{C1}$ and $V_{C2}$.

From the above it will be seen that voltage dividers 65b, 65c and 65d constitute means for approximating a neutral conductor voltage for motor M and more particularly that at any given time voltage dividers 65b, 65c, or 65d constitute means for summing the motor terminal voltages of the winding stages to which the effective voltage is being applied via the drive means at that time. Furthermore, electronically controlled switches 69b, 69d and 69f constitute means for connecting the outputs of the approximating means to one of terminals $V_{C1}$ or $V_{C2}$, which switches are responsive to command signals a–f to connect said one of terminals $V_{C1}$ or $V_{C2}$ only to that output of the approximating means associated with the pair of winding stages to which the effective voltage is being provided at that time.

From the above it will also be seen that voltage dividers 67a, 67b and 67c provide a set of back emf outputs, one for each stage. The voltage on each back emf output is a function of the terminal voltage of its associated winding stage at that particular time. Electronically controlled switches 69c, 69e and 69g constitute means responsive to command signals a–f to connect one of terminals $V_{C1}$ or $V_{C2}$ at a particular time only to a back emf output associated with a winding stage to which the effective voltage is not being provided at that time.

Terminals $V_{C1}$ and $V_{C2}$ are the negative and positive input terminals respectively of a difference amplifier A1 (FIG. 7) having a gain which is adjustable by means of a potentiometer R19. The reference voltage $V_R$ is also supplied via a 10K resistor R21 to the positive input of amplifier A1 to prevent offset errors. Inasmuch as the voltage on one of terminals $V_{C1}$ or $V_{C2}$ is the approximated neutral conductor voltage and the voltage on the other terminal is the back emf of the stage not then being energized, difference amplifier A1 constitutes means for comparing the approximated neutral conductor voltage with the back emf of one of the winding stages. It has been found that the output of amplifier A1 is a signal which represents the angular position of the rotor or rotatable assembly of the motor. Specifically, the output of amplifier A1 is a ramp voltage with a positive slope which starts generally at some predetermined negative voltage upon commutation. The output of amplifier A1 is supplied through an electronically controlled switch 71 to an integrator 73. Switch 71 has three independently actuable switch units 71a, 71b and 71c, only the first two of which are connected to the output of difference amplifier A1, switch unit 71a being connected to said output through a 33K resistor R23 and unit 71b being so connected through a 15K resistor R25. Two switch units are used because it is necessary for integrator 73 to have two different time constants, one for each speed of operation. When the motor is operating in the High speed mode, i.e., when external command signal SPEED is a logic High, switch unit 71b is closed and the output of difference amplifier A1 is applied to the integrator through resistor R25, which resistor determines the integrator's time constant. When signal SPEED is a logic Low, switch unit 71a is closed instead, and the input to the integrator occurs through resistor R23, which provides a second time constant for the integrator. Switch units 71a and 71b thus constitute means responsive to a speed control signal for providing two different time constants for the integrator corresponding to the two speeds of the DC motor. The SPEED command signal is applied to one input of an AND gate G1 and through an inverter 75 to one input of a second AND gate G3. The other inputs of gates G1 and G3 are connected to an internal command signal U, discussed below. When command signal U is High, both logic gates are enabled. However, the output of only one goes High. Because of the presence of inverter 75, the other signals at the inputs to gates G1 and G3, labelled H and L respectively, cannot both be High at once. Hence only one can have a High output at any given time and so only one of switch units 71a or 71b can be closed at a given time. Thus, inverter 75 and logic gates G1 and G3 constitute means for preventing both switch units from being closed at the same time.

The other switch unit of electronically controlled switch 71, namely unit 71c is controlled by an internal command signal D which is the complement of command signal U. When this switch unit is closed, which occurs from commutation until approximately 20 electrical degrees thereafter, the integrator is reset. Specifically, switch unit 71c constitutes means responsive to command signal D (which is a commutation signal or pulse) to reset the integrator. Integration is also inhibited during this time because command signal U (the complement of signal D) is Low at this time. As a result the outputs of gates G1 and G3 are both Low, switch units 71a and 71b are both open, and integration is inhibited.

Integrator 73 includes an 8.2 V Zener diode D17 which insures that the integration of the output of difference amplifier A1 does not start until the zero crossing of the back emf being examined. Once integrator 73 starts integrating, it integrates down from a voltage output of about 8 volts to a predetermined voltage level of about 3 volts, which output is indicative of the angular position of the rotor. This output is applied to a comparator 77 and when the output reaches 3 volts, the output of comparator 77, labelled C, goes High, which High is a commutation signal or pulse which represents the fact that the rotor is at the proper position for commutation of the winding stages.

Figure 7:
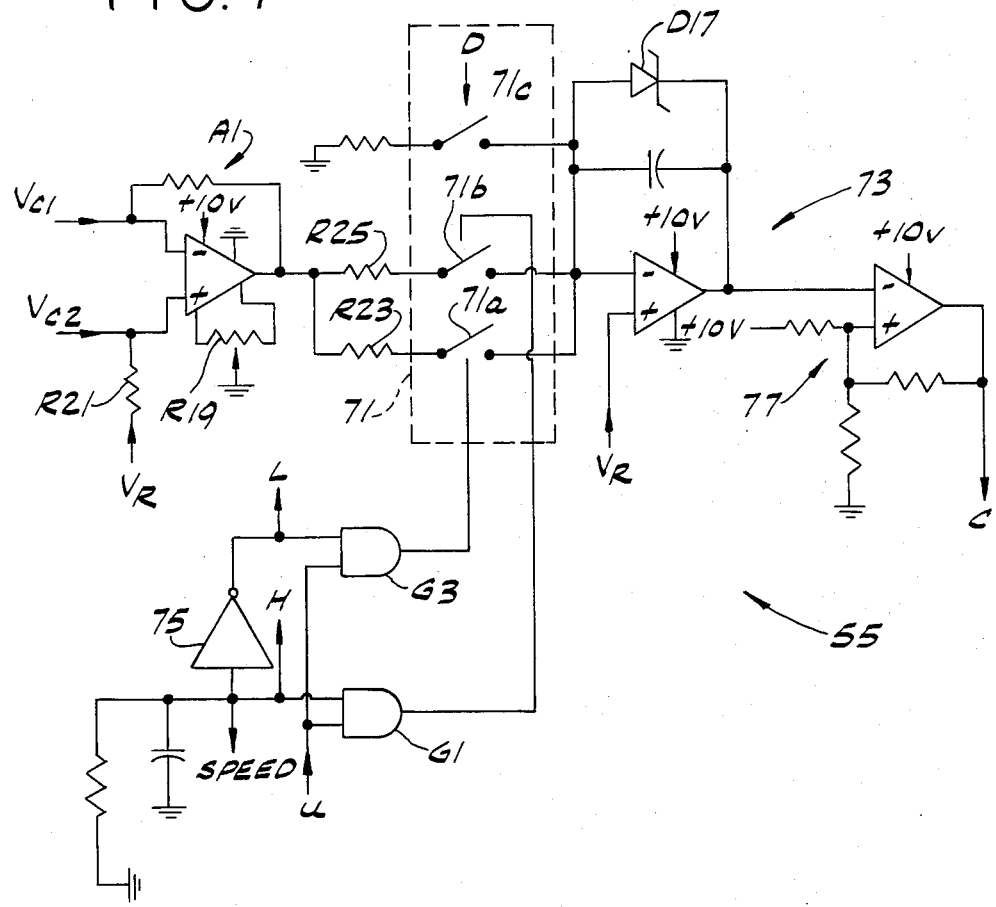
FIG. 7 is a schematic diagram of position sensing circuitry of the control system of this invention.
Figure 8:
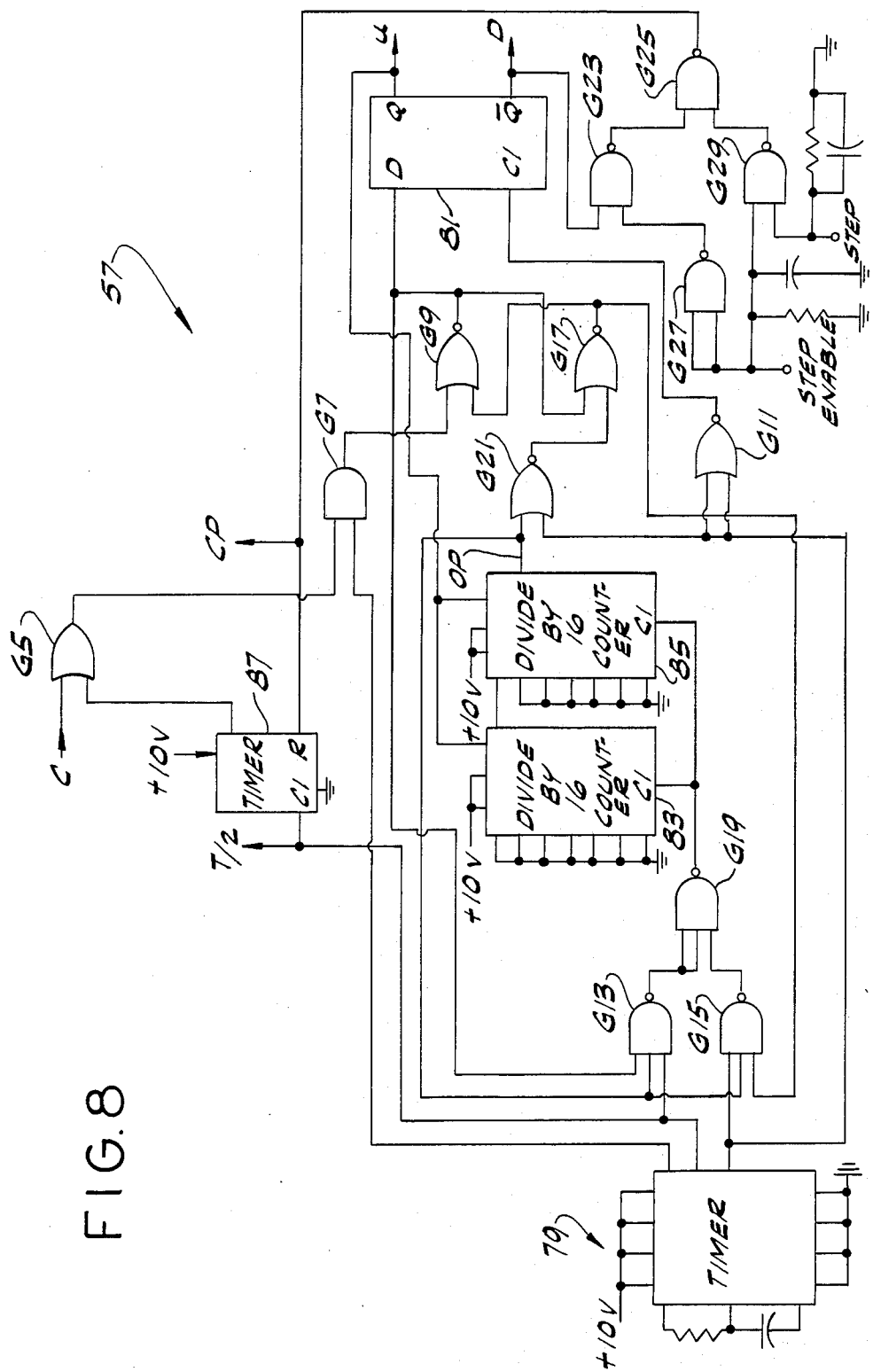
FIG. 8 is a schematic diagram of resetting or blanking circuitry of the control system of this invention.

The output of comparator 77 is supplied to commutation control circuit 57 and more specifically is applied to one input of an OR gate G5 (FIG. 8). When the comparator output is High, indicating that a commutation is required, the output of gate G5 goes High. The output of gate G5 is connected to an input of an AND gate G7, the other input of which is connected to the complementary output, generally about 50 KHz for instance, of a timer 79. When that timer output goes High while the output of gate G5 is High, the output of gate G7 goes High. This High output of gate G7 causes the output of a NOR gate G9 to go Low. A Low output of NOR gate G9 causes a Q output of a flip-flop 81 to go Low upon the next clock pulse from timer 79, which clock pulses are supplied via a NOR gate G11 at a preselected rate, such as for instance about 100 KHz. The Q output of flip-flop 81 is command signal U referred to above in connection with FIG. 7. Thus when the output of comparator 77 goes High, which is a commutation signal, command signal U goes Low. The Q-bar output of flip-flop 81 is command signal D.

The Q output of flip-flop 81 is supplied to the up-/down control pins of a cascaded pair of digital divide-by-sixteen counters 83 and 85. When this output goes Low, signifying commutation, the counters begin counting down. When they reach zero, which takes about twenty electrical degrees of the rotation of motor M, the output of the pair, labelled OP, goes Low. Output OP is connected to the inputs of two NAND gates G13 and G15 which control the rate at which counters 83 and 85 count up and down. While output OP is Low, which occurs only when the counters reach zero, these gates are disabled. Gate G13 also has an input connected to the output of gate G9 which inhibits gate G13 while the output of gate G9 is Low. As will appear, this output is Low for the predetermined interval, namely about twenty electrical degrees of the rotation of motor M after commutation, so for this period gate G13 is inhibited. The output of gate G9 is supplied to a second NOR gate G17. When the output of gate G9 goes Low, the output of gate G17 goes High. This High is fed back to gate G9 to latch its output Low and is applied to an input terminal of gate G15, enabling it. Another input of gate G15 is connected to the 100 KHz output of timer 79, so gate G15 while the output of gate G17 remains High allows clock pulses to pass through to a NAND gate G19 whose output is connected to the clock inputs of counters 83 and 85. This causes them to count down at a fast rate. When the counters reach zero, output OP goes Low and this Low is applied to one input of a NOR gate G21, causing its output to go High. This High output of gate G21 is applied to the other input of gate G17, causing its output to go Low and the output of gate G9 to go High. A Low output of gate G17 inhibits gate G15 while a High output of gate G9 enables gate G13 and latches the output of gate G17 Low. Gate G13 has another input which is connected to the 50 KHz output of timer 79. While gate G13 is enabled, clock pulses at this lower rate pass through gates G13 and G19 to the clock inputs of counters 83 and 85. A High output of gate G9 also sets the Q output of flip-flop 81 High, which starts the counters counting up again. Thus, the counters count up at a first rate and count down at a rate which is twice as fast. Specifically the counters count up during two-thirds of the time between subsequent commutations and count down for the remaining third. Commutations occur in this embodiment every sixty degrees, so the counters count down for twenty electrical degrees or so, which for a given speed of the motor corresponds to a predetermined length of time. This means that the integrator (FIG. 7) remains reset and inhibited for this predetermined length of time, corresponding to twenty electrical degrees of the rotation of motor M, as well because the U and D command signals, as explained above, control these facets of integrator operation. This is done to prevent the integration of the commutation currents which are present immediately after commutation. Thus, counters 83 and 85 constitute digital delay means for inhibiting the operation of integrator 73 for a predetermined interval of time after the occurrence of the commutation signal or pulse whereby the integrator is prevented from integrating the commutation currents.

The Q-bar output of flip-flop 81 is also applied to one input of a NAND gate G23. During the forty degree interval before commutation when the Q-bar output is Low, the output of gate G23 is High. The output of gate G23 is connected to one input of a NAND gate G25 whose other input is normally High, unless motor M is being operated as a stepper motor. The output of gate G25 during the forty degree interval before commutation is, therefore, Low. This output is provided to the reset input of a timer 87. When the Q-bar output goes High at commutation, the output of gate G23 goes Low (again assuming the motor is not being used as a stepper motor) and the output of gate G25 goes High. This Low to High transition resets timer 87 unless the timer had previously timed out. Timer 87 is set to time out if a commutation pulse or signal is not generated within a predetermined length of time, for example 0.1 second. Absence of a commutation signal would indicate that the rotor is not rotating, such as might occur during starting. If a commutation signal is not received in the predetermined length of time, timer 87 itself supplies a pulse to OR gate G5 to initiate rotation of the rotor. This supplying of pulses from timer 87 continues until the commutation signals are received before the end of each predetermined time interval. Thus, timer 97 constitutes resettable digital timer means for providing a pulse to initiate rotation of the rotor unless the commutation pulse is generated by comparator 77 before the expiration of a predetermined time interval, the timer being reset by the pulse or signal from the comparator.

As alluded to above, motor M may be operated as a stepper motor. This requires a High step enable external command signal, which High is inverted by a NAND gate G27 and hence disables gate G23, thereby making the output of flip-flop 81 irrelevant to the operation of the control system. The High step enable signal is also supplied to a NAND gate G29 whose other input is a STEP external command signal. Whenever the STEP signal goes High and gate G29 is enabled the output of gate G29 goes Low. This output is applied to the other input of gate G25, causing its output to go High, thereby resetting timer 87.

Figure 9:
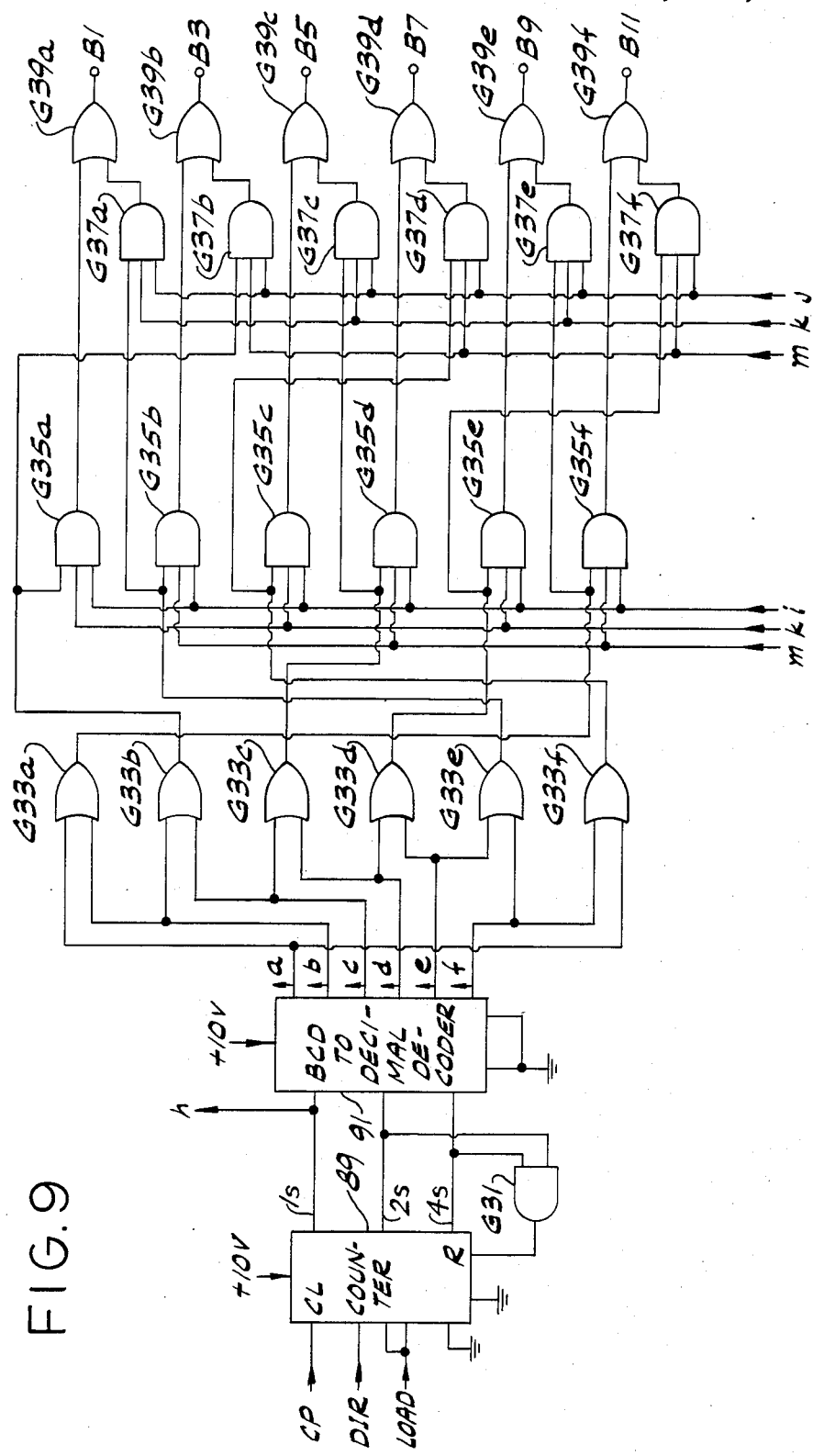
FIG. 9 is a schematic diagram of sequencing and logic circuitry of the control system of this invention.

The output of gate G25, whether controlled by the stepper motor control circuitry or by the rest of the circuitry of FIG. 8, is also supplied as an internal command signal CP to the remainder of the commutation control circuit (FIG. 9). Specifically the output of gate G25 is applied to the clock input of a counter 89 which has three binary outputs representing 1s, 2s and 4s respectively. All three outputs are connected to a BCD to decimal decoder 91 having six outputs a–f, mentioned above in connection with FIG. 6. The decoder takes the three binary outputs of counter 89 and decodes them to set one of command signals a–f High. In addition, the 1s output of counter 89 provides command signal "h" to the circuitry of FIG. 6 as discussed above. This output goes High every other commutation. The 2s and 4s output of counter 89 are also applied to the inputs of an AND gate G31, whose output is connected to the reset input of the counter. By means of this arrangement the counter is reset every six counts, which corresponds to six commutations (since the CP commutation signal is the source of the clock pulses for the counter) which corresponds to 360 electrical degrees. The six outputs of decoder 91 are connected to the inputs of six OR gates G33a–G33f, whose outputs in turn are connected to the inputs of a set of AND gates G35a–G35f used to control rotation of the rotor in the reverse direction and to the inputs of a set of AND gates G37a–G37f used to control rotation of the rotor in the forward direction. The outputs of gates G35a–G35f and G37a–G37f are connected to a set of OR gates G39a–G39f whose outputs are connected to terminals B1, B3, B5, B7, B9 and B11 of drive circuits 37a, 37b and 37c (see FIG. 4). Each of gates G35a–G35f has an input to which is supplied a command signal "i", discussed below, which enables those gates for rotation of the rotor in the reverse direction and disables them when forward rotation is required or when a predetermined maximum current is exceeded. Likewise, each gate G37a–G37f has an input to which is supplied a command signal "j", discussed below, which enables these gates for rotation of the rotor in the forward direction and disables them when reverse rotation is required or when a predetermined maximum current is exceeded. Moreover, gates G35a, G35c, G35e, G37a, G37c, and G37e each have an input to which is applied a command signal "k", discussed below, for pulse width modulating the outputs of these gates, and hence the control signal outputs of gates G39a, G39c and G39e, and for controlling the effective voltage and current applied to the winding stages as a result of the control signals. Likewise, gates G35b, G35d, G35f, G37b, G37d and G37f each have an input to which is supplied a command signal "m", discussed below, for pulse width modulating the outputs of these gates and the control signal outputs of gates G39b, G39d and G39f.

Each commutation signal on input CP to counter 89 causes the counter to count up one or down one, depending upon the state of an internal direction command signal DIR. Assuming forward rotation, the counter counts up once each commutation and the decoder in response sets the next output in the commutation sequence High. Starting with the "a" output, a High on output "a" causes the outputs of gates G33a and G33f to go High which in turn causes gates G37e and G37d to be enabled. (None of the reverse rotation gates are enabled because the desired rotation is in the forward direction.) Ignoring the pulse width modulation for the moment, the outputs of gates G37d and G37e, along with the control signal outputs of OR gates G39d and G39e to which they are connected, go High. Terminals B7 and B9 are thereby made High which causes current to flow from line 43 (see FIG. 4) through winding stage S3 and then through winding stage S2 and shunt resistor $R_S$ to the negative side of rectifier circuit 29. Upon the next commutation signal, command signal "b" of decoder 91 (see FIG. 9) goes High which, through a similar process results in terminals B3 and B9 being High and current flowing through winding stage S3 and then through winding stage S1 and shunt resistor $R_S$ to the negative side of the rectifier circuit. Note that a pair of winding stages are energized at a time. Denoting the winding stage of the energized pair which is more positive, i.e., driven by its associated first drive circuit, with the symbol "+", and the winding stage which is more negative, i.e., driven by its associated second drive circuit, with the symbol "−", the High control signals and the winding pairs which are energized thereby are as follows:

| High Control Signal | Energized Winding Pair in Forward Direction | Energized Winding Pair in Reverse Direction |
| --- | --- | --- |
| a | S3+ S2− | S2+ S3− |
| b | S3+ S1− | S1+ S3− |
| c | S2+ S1− | S1+ S2− |
| d | S2+ S3− | S3+ S2− |
| e | S1+ S3− | S3+ S1− |
| f | S1+ S2− | S2+ S1− |

Thus, counter 89, decoder 91, gates G33a–G33f, G35a–G35f, G37a–G37f, and G39a–G39f constitutes means responsive to the output of comparator 77 (FIG. 7) to cause the drive circuits 37a–37c to commutate the winding stages S1–S3 when the rotor reaches a predetermined angular position. They also constitute decoding or control signal means responsive to commutation signal CP for generating the set of control signals (the outputs of gates G39a–G39f) and providing the control signals to the drive circuits to commutate the winding stages when the rotor reaches a predetermined angular position.

Figure 10:
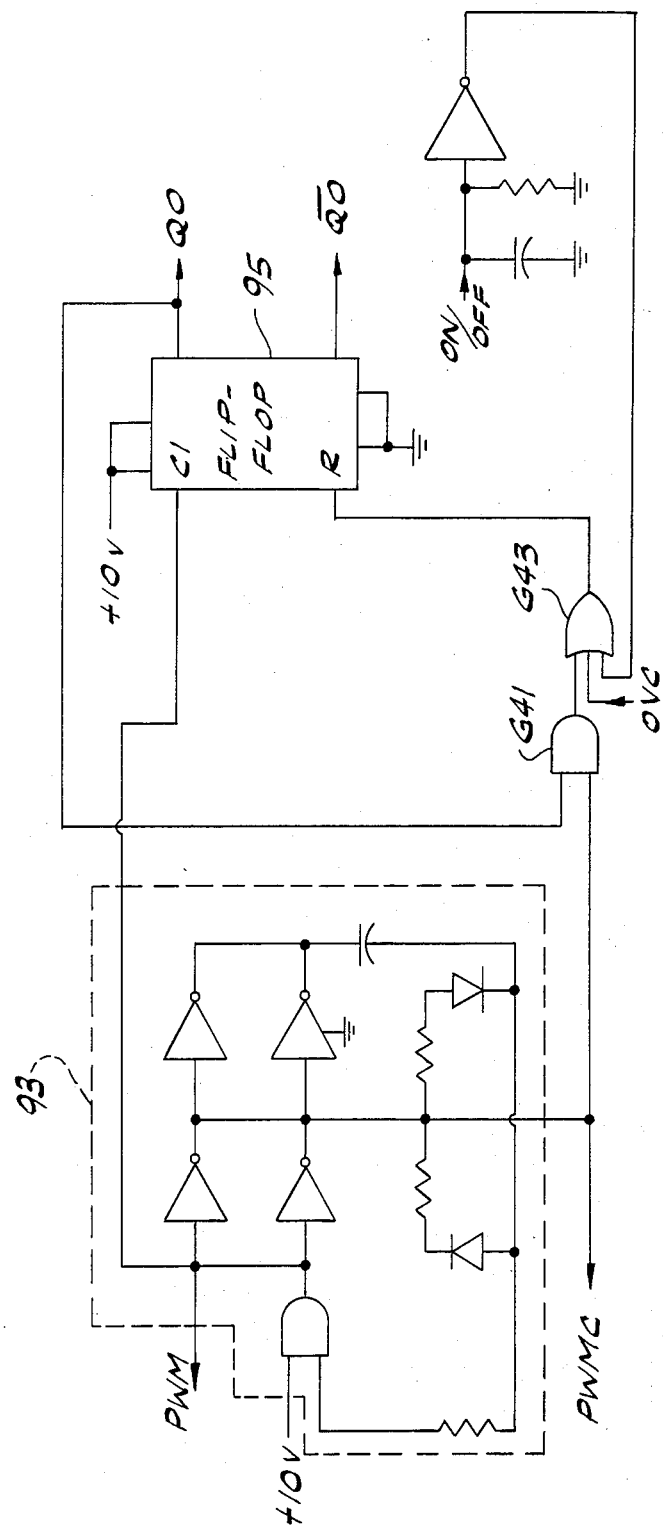
FIG. 10 is a schematic diagram showing pulse width modulation circuitry of the control system of this invention.

As mentioned above, energization of the winding stages is pulse width modulated to control effective voltage and current, and hence rotor speed. The source of the pulses for the modulation is a 10 KHz, 95% duty cycle oscillator 93 (See FIG. 10) having a 95% duty cycle output PWM and a complemented output PWMC. Output PWM is supplied to the clock input of a D-type flip-flop 95 which has its D-input tied High. The two outputs of flip-flop 95 are labelled QO and QO-bar. The QO output is supplied along with the complementary output PWMC of oscillator 93 to the inputs of an AND gate G41. Normally output QO is High, so complementary pulses pass through gate G41 to an OR gate G43. One of the other inputs to gate G43 has supplied to it the inverted form of the external command signal ON/OFF. When the ON/OFF signal is Low, the output of gate G43, which is connected to the reset input of flip-flop 95, is High and the flip-flop cannot be reset. However, if the ON/OFF signal is High, gate G43 can pass pulses from gate or regulator G41 or an over-voltage or over-current signal OVC, discussed below, to the reset input of the flip-flop to reset it. Once the flip-flop is reset, its output QO goes Low. This Low causes gate G41 to no longer be able to pass pulses to gate G43 and so the output of the latter gate will stay High, and the flip-flop will remain reset only so long as signal OVC, the over-voltage or over-current signal, remains High. Once the reset input goes Low, the next clocking pulse from the PWM output of the oscillator causes QO to go High again. Thus, in the absence of an over-voltage or over-current condition, QO stays High for 95% of the cycle, is reset Low for 5% and then goes High for 95% of the next cycle because of the clocking pulse which is generally coincident with the end of the reset pulse.

Output QO of flip-flop 95 is also applied to two OR gates G45 and G47 (see FIG. 11) whose output are the "k" and "m" inhibit and enable signals referred to above in connection with gates G35a–G35f. The other inputs to gates G45 and G47 are complementary, the other input to gate G47 being the output of an exclusive OR gate G49 while the other input to gate G45 is the inverted output of gate G49. Thus, at any given time the output of gate G45 or G47 will be High irrespective of the state of output QO while the output of the other gate will follow directly the state of output QO. Since QO is a series of pulses, this means that command signal "k" or "m", but not both, will be a series of pulses while the other command signal will be High. An examination of FIGS. 9 and 4 reveals that the "k" command signal enables the logic gates associated with the first or upper drive means for each winding stage while the "m" command signal enables the logic gates associated with the second or lower drive means for each winding stage. Since only signal "k" or signal "m" but not both, can be a series of pulses at any given time, this means that for a given commutation only one of the first or second drive means will be pulse width modulated. The other drive means which is energized for that particular commutation remains on continuously until some change is made in the states of signals "k" and "m".

The inputs to exclusive OR gate G49 determine which drive means is pulse width modulated and which is not at a particular time. One input is signal "h" from counter 89 (FIG. 9) which changes state each commutation. This input assures that the first and second drive means will be utilized equally. When the change from pulsing signal "k" to pulsing signal "m" actually takes place is determined by the other input to gate G49, which input is connected to the output of an AND gate G51. AND gate G51 has as inputs the D command signal from flip-flop 81 (FIG. 8), which is High for twenty electrical degrees after each commutation and is Low otherwise, and external command signal SLOW/FAST COMMUTATION. If the external command signal is Low, the output of gate G51 is Low and the change in signals "k" and "m" occurs with the commutation. This ensures that the winding stage which stayed on is pulse width modulated, which is called fast commutation. For example, in the second commutation of the commutation sequence, signal "h" is Low and the energized windings are S3− and S1+. Winding stage S3− has been on before the commutation and remains on after the commutation while winding stages S1+ was just turned on at the commutation. Since signal "h" is Low and external command signal SLOW/FAST COMMUTATION is Low, the output of gate G49 is Low, signal "k" is High and signal "m" in a series of pulses. But signal "m" is the one associated with the second drive means for all the winding stages, so winding stage S3−, the winding stage which remained energized, is pulse width modulated. Fast commutation, as the term is used herein, refers to commutation which causes the current in the winding which was just turned off to decay or extinguish itself as fast as possible while slow commutation is the opposite of fast commutation. In the particular form of slow commutation described in the present application, slow commutation is a two-step process because the position sensing integrator described herein is affected by the particular winding being pulse width modulated. With different position sensing circuitry, slow commutation would not necessarily be a two-step process.

When external signal SLOW/FAST COMMUTATION is High, the output of gate G51 is also High, but only for twenty electrical degrees after commutation. Since the output of gate G51 and signal "h" both change state at the time of commutation but the output of the gate then also changes state twenty degrees thereafter, the change in status of signals "k" and "m" now occurs not at commutation but twenty electrical degrees after commutation. Furthermore, unlike the fast commutation situation, the winding stage just commutated on is the one which is pulse width modulated, and the winding stage which is not commutated, i.e., which remained energized, is not pulse width modulated. Taking the second commutation as an example again, at commutation signal "h" goes Low but the output of gate G51 goes High. Thus, the output of gate G49 remains unchanged, namely High, and signal "k" is a series of pulses but signal "m" is High. But signal "k" is the one associated with the first drive means for all the winding stages, so winding stage S1+, the winding stage which was commutated on is pulse width modulated, which is called slow commutation. When signal D goes Low, twenty electrical degrees after commutation, signal "k" goes High while signal "m" becomes a series of pulses. Note that the shift from pulse width modulating one winding stage to pulse width modulating the other in slow commutation occurs well after commutation so that the winding currents have had time to transfer to the winding stage which was just commutated.

In both the fast and slow commutation modes, when output QO goes Low because of an over-voltage or over-current condition, signal "k" or signal "m" goes Low and stays Low until the effective voltage or current to the winding stage falls to the desired limit. That is, the pulses from the oscillator are inhibited until the desired voltage or current is reached. Since at any time the level of one of signals "k" or "m" is independent of the state of output QO, that signal remains High even though the over-voltage or over-current condition exists. One of the drive means thus remains on during these over-voltage or over-current conditions to allow the winding currents to circulate.

Thus, it is seen that the oscillator and logic states discussed above in connection with the pulse width modulation of the winding stage drive circuits constitute means for controlling the application of the DC voltage output of rectifier circuit 29 to provide a resultant effective voltage to the winding stages. Furthermore, the circuitry of FIGS. 10 and 11 constitutes means for pulse width modulating the outputs of gates G39a–G39f, whereby a resultant effective voltage is provided to the winding stages. The duty cycle of the pulse width modulating pulses is reduced in response to an applied voltage above a predetermined level as indicated by the state of signal OVC. Logic gates G45 and G47 are seen to constitute means for temporarily inhibiting less than all the outputs of gates G39a–G39f, specifically for temporarily inhibiting three of said outputs, when the motor current as represented by signal OVC exceeds a predetermined value. Moreover, since only one of these three inhibited gates would have been enabled at any one time, and only one of the other three gates would be High at that time, gates G45 and G47 are seen to constitute means responsive to an applied voltage exceeding a predetermined voltage level, or a motor current exceeding the predetermined current value, for temporarily inhibiting all the control signals but one to reduce the effective voltage applied to the winding stages.

The circuitry of FIG. 9 also constitutes logic means responsive to signal CP, which is representative of the angular position of the rotor, for supplying the outputs of gates G39a–G39f to the drive circuits in a sequence in which for each commutation one of the winding stages which was energized before commutation remains energized after commutation and the other winding stage which was energized before commutation becomes deenergized after commutation. Each winding stage remains energized through two successive commutations unique to it and then becomes deenergized. Note also that the direction of current flow in the winding stage which remains energized after commutation is the same as the direction of current flow in that winding stage before commutation. When the external command signal SLOW/FAST COMMUTATION calls for fast commutation, the circuitry of FIGS. 10 and 11 constitutes means for pulse width modulating the output of the respective gate in the set of gates G39a–G39f associated with the winding stage which remains on after commutation until a predetermined time after commutation, corresponding to rotation of twenty electrical degrees, and for shifting at that time to pulse width modulate the output associated with the winding stage which will remain on after the next commutation. That circuitry also constitutes means for modulating the outputs of gates G39a–G39f substantially equal amounts and specifically for modulating those outputs for the first drive means and those outputs for the second drive means substantially equal amounts. In this respect counter 89 constitutes means for generating a drive selection signal, namely signal "h", which changes state every commutation, the circuitry of FIG. 11 being responsive to one state of signal "h" to shift from modulating the outputs for controlling the first drive means to modulating the outputs for the second drive means upon the expiration of the predetermined time after commutation and being responsive to a second state of the drive selection signal to shift from modulating the control outputs for the second drive means to modulating the control outputs for the first drive means upon the expiration of the predetermined time after commutation. Of course when the SLOW/FAST COMMUTATION command signal is Low, the pulse width modulating means is controlled by the circuitry of FIG. 11 to pulse width modulate the control output of gates G39a–G39f associated with the winding stage which was just commutated on upon completion of commutation.

Figure 12:
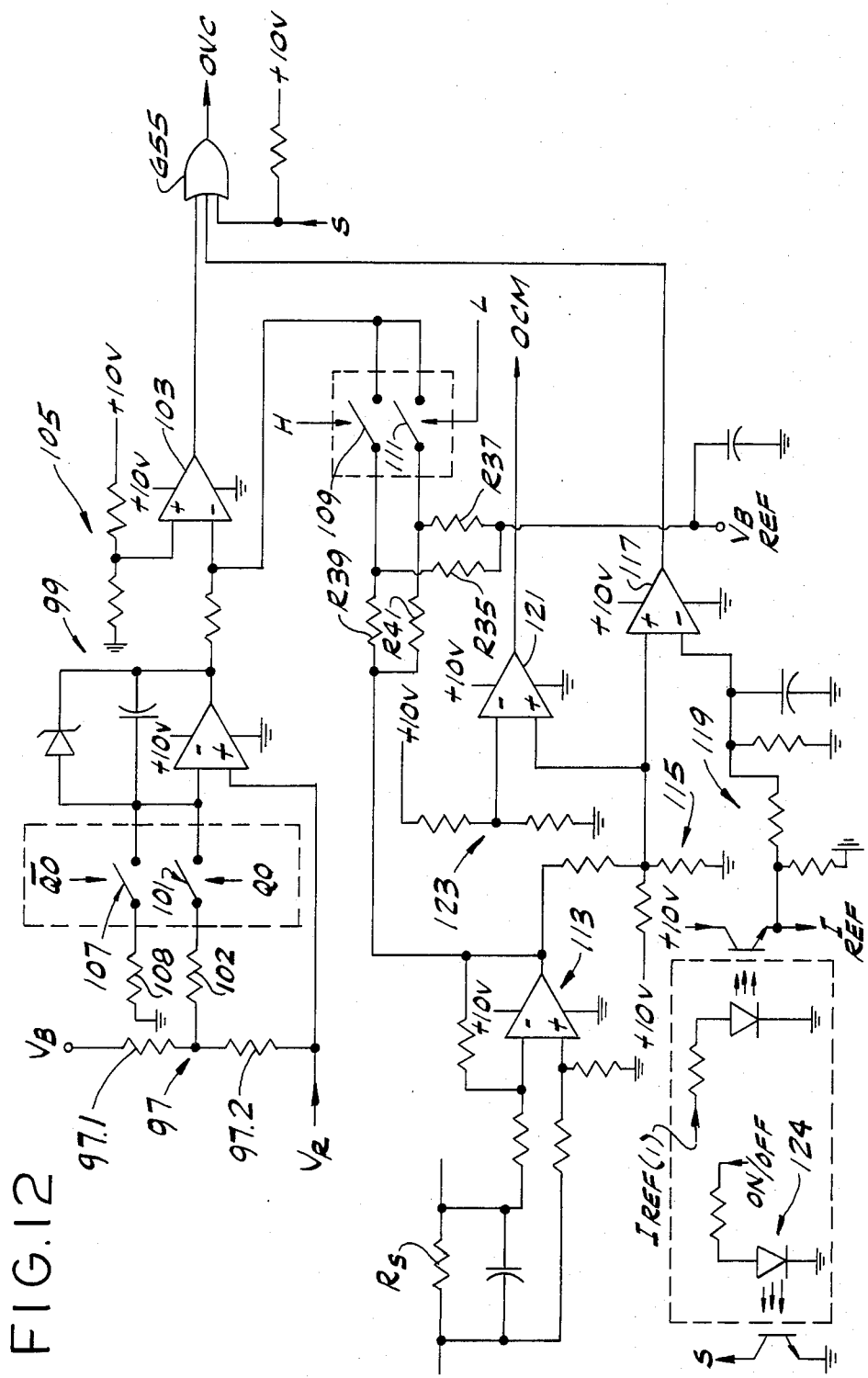
FIG. 12 is a schematic diagram of regulating circuitry of the control system of this invention.

Turning now to FIG. 12 there is shown the circuitry for detecting the over-voltage and over-current conditions mentioned above. The voltage $V_B$ from the positive side of rectifier circuit 29 is applied to one end of a voltage divider 97 consisting of a 150K resistor 97.1 in series with a 4.7K resistor 97.2. The 1.5 Volt reference voltage, $V_R$, is applied to the other end of the 4.7K resistor 97.2 and to the positive input of an integrator 99. The negative input of integrator 99 is connected through an electronically controlled switch 101 and a 56K resistor 102 to the intermediate junction of voltage divider 97. The control input of switch 101 is connected to output QO of flip-flop 95 (FIG. 10) which is normally High during the positive portion of the pulses from oscillator 93. When output QO is High, the integrator integrates the applied voltage $V_B$ down and supplies this integrated output to a comparator 103. If this integrated output falls to a predetermined level, determined by a voltage divider 105 connected to the other input of comparator 103, the output of the comparator goes High. This output is applied to an input of an OR gate G55 whose output is signal OVC discussed above. The negative input of integrator 99 is also connected via an electronically controlled switch 107 and a 270-Ohm resistor 108 to ground. Switch 107 is actuated by a High QO-bar output from flip-flop 95, which output occurs at the 10 KHz oscillator pulse rate. If the applied voltage does not exceed the predetermined maximum voltage before the integrator is reset by output QO-bar, the output of comparator 103 stays Low, as does signal OVC. Conversely, when the applied voltage is above the predetermined magnitude, signal OVC does go High, truncating that particular pulse being applied to the logic gates of FIG. 9 to thereby reduce the effective applied voltage. Thus, the circuitry of FIG. 12 discussed to this point constitutes means for regulating the magnitude of the applied DC voltage to motor M.

The negative input of comparator 103 is also connected to a pair of electronically controlled switches 109 and 111, the first of which is closed by a High signal H from FIG. 7, indicating high speed operation of the motor, and the second of which is closed by a High signal L from FIG. 7, indicating low speed operation of the motor. Switch 109 is connected, on the side away from the comparator, through a 39K resistor R35 to an external command signal $V_{BREF}$ which can be a sine wave or any other desired waveform of the motion of shaft 5 in accordance with which the shaft is to operate. Likewise switch 111 is connected through a 56K resistor R37 to signal $V_{BREF}$. Switches 109 and 111 are also respectively connected via a resistor R39 and a resistor R41 to the output of a difference amplifier 113 whose output represents the motor current through shunt resistor $R_S$. In fact resistor $R_S$ is connected across the inputs to amplifier 113. It is desirable to use electronically controlled switches 109 and 111 and their associated circuitry in voltage regulation for IR compensation.

The output of amplifier 113 is also supplied via a voltage divider 115 to the non-inverting input of an op amp 117, whose other input is connected through another voltage divider 119 to a reference current signal $I_{REF}$. Signal $I_{REF}$ is shown as being derived from an external, optically isolated digital current reference $I_{REF(1)}$ although other sources of signal $I_{REF}$ could be used. When the motor current exceeds a predetermined level, the output of amplifier 117 goes High, causing signal OVC to become High, signifying an over-current condition. As explained above, this temporarily inhibits the logic gates of FIG. 9 to reduce the current flow through the motor.

The output of voltage divider 115, representing the motor current, is also applied to the noninverting input of another op amp 121, whose inverting input is connected to the junction of a voltage divider 123. When the motor current exceeds another predetermined value which is larger than the predetermined current value which causes signal OVC to become High, which situation could occur in the case of a failure of the control system itself, the output of amplifier 121 (labelled OCM) goes High. As discussed below, when signal OCM goes High, all the drive transistors are turned off and remain off until the system is manually reset.

Also shown on FIG. 12 is a circuit 124 for generating a command signal S which is the complement of external command signal ON/OFF. When signal ON/OFF is Low, indicating a desired off condition, command signal S is High. This signal is supplied to OR gate G55, causing signal OVC to be High, thereby inhibiting further rotation of the motor so long as the ON/OFF signal is Low.

Turning now to FIG. 13, there is shown a flip-flop 125 whose reset input has the OCM signal applied thereto. When the OCM signal goes High, signifying an excessive, uncontrolled current, the Q-bar output of flip-flop 125 goes High causing a light-emitting diode indicator 126 to light. Moreover, the Q output of the flip-flop goes Low when this condition occurs. The Q output of flip-flop 125 is connected to an input of an AND gate G57. When this output goes Low, gate G57 is disabled—its output goes Low. The output of gate G57 is connected to a pair of AND gates G59 and G61, whose outputs are command signals "i" and "j". One of these command signals is usually High, the particular one being determined by the desired direction of rotation of the rotor. However when the output of gate G57 goes Low, both signals "i" and "j" go Low, thereby inhibiting logic gates G35a–G35f and G37a–G37f. This stops commutation of the motor until the Q output of flip-flop 125 goes High again. But this can happen only by turning off the power to the control system and then turning it back on; otherwise there would be no clock pulse applied to the clock input of flip-flop 125. Thus, amplifier 121 and flip-flop 125 constitute means for inhibiting logic gates G35a–G35f and G37a–G37f to prevent the generation of the set of control output signals of gates G39a–G39f when the motor current exceeds a predetermined maximum value, the inhibiting means maintaining the inhibition of the logic gates until it is manually reset.

Also shown in FIG. 13 is protective circuitry indicated generally at 129 for protecting the drive transistors when a reversal of direction of rotation of the rotor is required. Protective circuitry 129 includes a latch 131, and a pair of cascaded flip-flops 133 and 135. A pair of flip-flops is used so that upon a requested change in direction an entire pulse from the oscillator 93 passes before the reversal takes place so that current does not shoot through any of the drive transistors upon reversal. The D input of latch 131 is connected through a resistor R45 to the external command signal DIRECTION and through a resistor R47 to its own Q output. When the desired direction of rotation is forward, the DIRECTION command signal is High and the Q output of latch 131 is High; or in the case where the DIRECTION signal just became High, it goes High at the next clock pulse PWM from the 10 KHz oscillator. The High Q output enables gate G61 so that, if all other conditions are met, signal "j", the enable signal for all the forward rotation gates (gates G37a–G37f), goes High. One of those other conditions is that the maximum over-current condition not exist and the other is that the Q output of the latch must pass through both flip-flops 133 and 135. The Q output of latch 131 is connected to the D input of flip-flop 133 so that it is sent on to the D input of flip-flop 135 as soon as a clock pulse is received from the complementary output PWMC of the 10 KHz oscillator. And the signal does not appear on the Q output of flip-flop 135 until the next clock pulse to flip-flop 135 is supplied on a line in FIG. 13 labelled T/2 from the 50 kHz output of timer 79 (FIG. 8) which line is also labelled T/2 at its connection to an input C1 of timer 87.

If the DIRECTION signal had previously been Low, the Q-bar output of latch 131 would have been High and gate G59, the reverse rotation enabling gate, would have had a High output "i". Upon the change in the state of the DIRECTION signal, the Q-bar output of latch 131 immediately goes Low, thereby turning off all the drive transistors. Only after the change in state reaches the Q output of flip-flop 135 does the output of gate G61 go High, enabling rotation in the other direction. Operation of this circuit when the change of the DIRECTION signal is from High to Low is analogous to that described above. Thus, latch 131 and flip-flops 133 and 135 constitute means responsive to a change in state of the DIRECTION signal to delay the switching from the sequence of commutations for rotation in one direction to the sequence of commutations for rotation in the other direction as required by the new state of the DIRECTION signal until the expiration of a predetermined delay time, equivalent to at least one pulse from the 10 KHz oscillator, after the change in state of the direction signal.

The Q and Q-bar outputs of flip-flop 135, labelled DIR and LOAD respectively are provided to counter 89 (FIG. 9) to control the direction of the counting and to load the counter initially with either "0" or "5", depending upon the direction of the count. Thereafter operation of the circuit of FIG. 9 proceeds as previously described with the counter counting up for rotation in the forward direction and with the counter counting down for rotation in the reverse direction.

From the foregoing, it is now apparent that novel control systems for an electronically commutated DC motor, novel methods of operating an electronically commutated motor, and novel laundering apparatus have been disclosed for accomplishing the objects set forth hereinbefore, as well as others, and that changes as to the precise arrangements, shapes, details and connections of the component parts, as well as the steps of the methods, may be made by those having ordinary skill in the art without departing from the spirit of the invention or the scope thereof as set out in the claims which follow.

What I claim as new and desired to secure by Letters Patent of the United States is:

1. A control system for an electronically commutated motor having a rotatable assembly and a stationary assembly with a plurality of winding stages having respective terminals, the control system comprising:

controlling means for controlling the application of a DC voltage to provide a resultant effective voltage to the winding stages, said controlling means including commutating means for commutating the winding stages by applying the DC voltage thereto in at least one preselected sequence to cause rotation of the rotatable assembly;

approximating means for approximating a neutral conductor voltage for the motor wherein said approximating means has outputs corresponding to each of a plurality of pairs of the winding stages, the voltage on each output being a function of the sum of the terminal voltages of its corresponding pair of winding stages; and comparing means for comparing the approximated neutral conductor voltage with the terminal voltage of one of the winding stages which is unenergized, the output of said comparing means representing the angular position of the rotatable assembly;

said controlling means being responsive to the output of said comparing means to cause said commutating means to commutate the winding stages when the rotatable assembly reaches a predetermined angular position.

2. The control system as set forth in claim 1 wherein the effective voltage is provided to less than all the winding stages at a time, the terminal voltage for said comparing means being obtained from a winding stage not having the effective voltage applied to it at that time, said approximating means including summing means for summing the terminal voltages of at least two of the winding stages to which the effective voltage is being provided at that time.

3. The control system as set forth in claim 2 wherein the motor has three winding stages, the effective voltage being provided to only two of the stages at a time, the third stage providing the terminal voltage for said comparing means, said summing means including means for summing the terminal voltages of the two stages to which the effective voltage is being provided at that time.

4. The control system as set forth in claim 1 further comprising electronically controlled switch means for connecting the outputs of said approximating means to a selected one of two inputs of said comparing means, said electronically controlled switch means being responsive to said controlling means to connect said selected one input of said comparing means at a particular time only to that output of said approximating means associated with the pair of winding stages to which the effective voltage is being provided at that time.

5. The control system as set forth in claim 4 wherein the back emf of each of the winding stages has different polarities relative to neutral upon different commutations, and further comprising second electronically controlled switch means responsive to said controlling means for selectively connecting to said winding stages the other of said two inputs of said comparing means, thereby to maintain the same polarity of the back emf relative to neutral across said two inputs of said comparing means upon different commutations.

6. The control system as set forth in claim 1 further comprising electronically controlled switch means for connecting the outputs of said approximating means to one input of said comparing means, said electronically controlled switch means being responsive to said controlling means to connect to said comparing means at a particular time only an output of said approximating means associated with a pair of winding stages to which the effective voltage is being provided at that time.

7. The control system as set forth in claim 6 further comprising a set of back emf outputs, one for each winding stage, the voltage on each back emf output being a function of the terminal voltage of its associated winding stage at that particular time, and second electronically controlled switch means for connecting a second input of said comparing means to the back emf outputs, said second electronically controlled switch means being responsive to said controlling means to connect said comparing means at a particular time only to a back emf output associated with a winding stage to which the effective voltage is not being provided at that time.

8. The control system as set forth in claim 7 wherein the motor has three winding stages, the effective voltage being provided to only two of the stages at a time, and said second electronically controlled switch means being responsive to said controlling means for connecting the second input of said comparing means to the back emf output associated with the third winding stage.

9. The control system as set forth in claim 1 wherein said comparing means includes
integrator means for integrating the back emf of the winding stage to which the effective voltage is not being provided at a given time relative to the approximated neutral conductor voltage, and
commutation signal generating means for generating a commutation signal when the integrating reaches a predetermined level, the commutation signal being the output of said comparing means.

10. The control system as set forth in claim 9 further comprising means connected to said commutation signal generating means for providing respective signals for inhibiting the operation of said integrator means for first lengths of time in response to corresponding ones of the commutation signals, so that the first lengths of time are approximately a predetermined fraction of respective varying lengths of time between successive commutations.

11. A control system for an electronically commutated motor having a rotatable assembly and a stationary assembly with a plurality of winding stages, the control system comprising:
commutating means for commutating the winding stages by applying a DC voltage thereto in at least one preselected sequence to cause rotation of the rotatable assembly;
pulse width modulating means connected to said commutating means for pulse width modulating the DC voltage so that the DC voltage is applied by said commutating means in voltage pulses having a predetermined maximum duty cycle; and
means integrating connected to said pulse width modulating means for repeatedly integrating the DC voltage over the width of each of the voltage pulses and truncating each of the voltage pulses upon the integration reaching a predetermined level, said integrating means being reset before each voltage pulse.

12. The control system as set forth in claim 11 wherein the winding stages have an IR voltage drop when current passes through them, the control system further comprising means for sensing the current passing through the winding stages and effectively adjusting the predetermined level of said means for repeatedly integrating the DC voltage by an amount proportional to the current sensed, whereby voltage regulation for compensation of the IR voltage drop is achieved.

13. The control system as set forth in claim 17 further comprising:
means for sensing a back emf signal indicative of the back emf condition of at least one winding stage;
commutation pulse generating means responsive to the back emf signal for generating a commutation pulse when the back emf signal indicates that a predetermined angular position of the rotatable assembly has been reached; and
means connected to the commutation pulse generating means for generating a set of control signals for said commutating means in response to receipt of a pulse to commutate the winding stages.

14. The control system as set forth in claim 11 wherein each winding stage of the motor has at least two terminals, one of which is commonly connected to one terminal of each of the other winding stages and the DC voltage is applied by said commutating means to pairs of other terminals of the winding stages in at least one preselected sequence and said pulse width modulating means includes:
logic means responsive to a signal representative of the angular position of the rotatable assembly for supplying a set of control signals to said commutating means in a sequence in which for each commutation one of the winding stages which was energized before commutation remains energized after commutation and the other winding stage which was energized before commutation becomes deenergized after commutation, each winding stage remaining energized through two successive commutations unique to it and then becoming deenergized, the direction of current flow in the winding stage which remains energized after commutation being the same as the direction of current flow in that winding stage before commutation; and
means for width modulating upon commutation the control signal associated with the winding stage which remained energized.

15. A control system for an electronically commutated motor having a rotatable assembly and a stationary assembly with a plurality of winding stages, the control system comprising:
commutating means responsive to a set of control signals for commutating the winding stages by applying a DC voltage thereto in at least one preselected sequence to cause rotation of the rotatable assembly;
commutation signal producing means responsive to a back emf signal indicative of the back emf condition of at least one winding stage for producing a commutation signal indicative of a predetermined angular position of the rotatable assembly; and
control signal means responsive to the commutation signal for providing the set of control signals to said commutating means to commutate the winding stages when the rotatable assembly reaches the predetermined angular position;

said control signal means including inhibiting means for inhibiting the operation of said commutation signal producing means for first lengths of time after corresponding occurrences of the commutation signal so that the first lengths of time are approximately a predetermined fraction of respective varying lengths of time between successive commutations, whereby commutation currents are prevented from affecting said commutation signal producing means.

16. The control system as set forth in claim 15 wherein said control signal means further includes digital resetting means for resetting said commutation signal producing means each time the winding stages are commutated, said digital resetting means including an electronically controlled switch responsive to the commutation signal to reset said commutation signal producing means.

17. The control system as set forth in claim 15 wherein the predetermined fraction is approximately one-third whereby the first lengths of time correspond to approximately twenty electrical degrees of rotation of the rotatable assembly.

18. The control system as set forth in claim 15 wherein said inhibiting means includes means for repeatedly causing an electrical signal to increase at a first rate until the commutation signal occurs and then to decrease from a value so attained at a faster rate until a predetermined electrical value is reached and then to increase again at the first rate until the next commutation signal occurs, and means for disabling the operation of said commutation signal producing means while the electrical signal is changing at the faster rate, thereby defining the first lengths of time.

19. The control system as set forth in claim 15 wherein said inhibiting means includes means for generating sets of clock pulses having a first rate and a second faster rate, counting means for counting the clock pulses, means for causing said counting means to count the clock pulses at the first rate until the commutation signal occurs and then to count in reverse at the faster rate until a predetermined count is reached and then to resume counting the clock pulses at the first rate until the next commutation signal occurs, and means for preventing the operation of said commutation signal producing means while the counting is reversed, thereby defining the first lengths of time.

20. The control system as set forth in claim 15 further comprising resettable digital timer means for providing a starting pulse to said control signal means to initiate rotation of the rotatable assembly, said timer means providing the pulse to said control signal means unless the commutation signal occurs before the expiration of a predetermined time interval.

21. The control system as set forth in claim 15 wherein the commutation signal producing means comprising intergrating means for integrating a portion of the back emf signal.

22. The control system as set forth in claim 21 wherein the motor is a two-speed motor, said control system further including time constant providing means responsive to a speed control signal for providing two different time constants for said integrating means corresponding to the two speeds of the motor.

23. The control system as set forth in claim 22 wherein said time constant providing means includes a pair of electronically controlled switches and logic circuitry for preventing both switches from being closed as the same time.

24. The control system as set forth in claim 15 wherein said commutating means includes regulating means for regulating the magnitude of the applied DC voltage, said control system further including pulse width modulating means connected to said regulating means for pulse width modulating the set of control signals, whereby a resultant effective voltage is provided to the winding stages, said pulse width modulating means being responsive to an integral of the applied voltage above a predetermined level to reduce the duty cycle of the pulses applied to the winding stages.

25. The control system as set forth in claim 15 further comprising second inhibiting means for inhibiting the control signal means to prevent the generation of the set of control signals when the motor current exceeds a predetermined maximum value, said second inhibiting means maintaining the inhibition of said control signal means until it is manually reset.

26. A control system for an electronically commutated motor having a rotatable assembly and a stationary assembly with a plurality of winding stages, the control system comprising:

commutating means responsive to a set of control signals for commutating the winding stages by applying a DC voltage thereto in at least one preselected sequence to cause rotation of the rotatable assembly;

position sensing and providing means for sensing the angular position of the rotatable assembly and for providing a commutation signal indicative of a predetermined angular position of the rotatable assembly;

control signal means responsive to said position sensing and providing means for generating the set of control signals for said commutating means to commutate the winding stages when the rotatable assembly reaches the predetermined angular position; and inhibiting means including means for comparing the motor current with a predetermined maximum value and actuable means connected to said comparing means for inhibiting the control signal means to prevent the generation of the set of control signals when the motor current exceeds the predetermined maximum value, said actuable means having input means for receiving a resetting signal and including means for maintaining the inhibition of said control signal means until a resetting signal appears at the input means.

27. The control system as set forth in claim 26 wherein said inhibiting means includes temporary inhibiting means for temporarily inhibiting fewer than all the control signals when the motor current exceeds a second predetermined value, said second predetermined current value being less than the predetermined maximum current value.

28. The control system as set forth in claim 27 wherein the motor has three winding stages, said control signal means including at least six logic gates, only three of which are inhibited when the motor current exceeds the second predetermined value.

29. The control system as set forth in claim 27 wherein the motor is a two-speed motor, said inhibiting means including means responsive to a speed control signal for providing two different predetermined second current values corresponding to the two speeds of the motor.

30. The control system as set forth in claim 27 further comprising means for sensing the voltage applied to the winding stages, said temporary inhibiting means being responsive to an integral of the DC voltage exceeding a predetermined voltage level to temporarily inhibit all the control signals but one to reduce the effective voltage applied to the winding stages.

31. The control system as set forth in claim 26 wherein the set of control signals are produced at the outputs of a set of logic gates and wherein said actuable means has an inhibit signal output for providing an inhibit signal when the predetermined maximum current value is exceeded, each of said logic gates having inputs connected to the inhibit signal output of said actuable means to receive the inhibit signal.

32. A control system for an electronically commutated motor having a rotatable assembly and a stationary assembly with a plurality of winding stages, said control system comprising:

commutating means responsive to a set of control signals for commutating the winding stages by applying a DC voltage thereto in at least one preselected sequence to cause rotation of the rotatable assembly, each winding stage having at least two terminals, one of which is commonly connected to one terminal of each of the other winding stages and the DC voltage is applied to pairs of other terminals of the winding stages in at least one preselected sequence;

logic means responsive to a signal representative of the angular position of the rotatable assembly for supplying the control signals to said commutating means in a sequence in which for each commutation one of the winding stages which was energized before commutation remains energized after commutation and the other winding stage which was energized before commutation becomes deenergized after commutation, each winding stage remaining energized through two successive commutations unique to it and then becoming deenergized, the direction of current flow in the winding stage which remains energized after commutation being the same as the direction of current flow in that winding stage before commutation; and pulse width modulating means for pulse width modulating the control signal associated with the winding stage which was commutated on until a time after commutation and for shifting at that time to pulse width modulate the control signal associated with the winding stage which will be deenergized after the next commutation.

33. The control system as set forth in claim 32 wherein said commutating means includes first drive means associated with each winding stage for allowing the flow of current through its associated winding stage in a first direction in response to a first one of the control signals and second drive means associated with each winding stage for allowing the flow of current through its associated winding stage in the opposite direction in response to a second one of the control signals.

34. The control system as set forth in claim 33 further comprising inhibiting means responsive to a signal indicative of motor current for inhibiting said logic means to prevent the generation of the set of control signals when the motor current exceeds a predetermined maximum value, thereby turning off said first and second drive means for all the winding stages, said inhibiting means preventing the generation of control signal until it is manually reset.

35. The control system as set forth in claim 34 wherein said inhibiting means includes temporary inhibiting means for temporarily inhibiting all but one of the control signals when the motor current exceeds a second predetermined value, the second predetermined current value being less than the predetermined maximum current value, whereby one of said first and second drive means is left on to allow circulation of the winding currents.

36. The control system as set forth in claim 35 wherein the motor is a two-speed motor, said inhibiting means including means responsive to a speed control signal and to an applied voltage exceeding a predetermined level to reduce the effective voltage applied to the winding stages.

37. The control system as set forth in claim 35 further comprising means for sensing the voltage applied to the winding stages, said temporary inhibiting means being responsive to an applied voltage exceeding a predetermined level to temporarily inhibit all the control signals but one to reduce the effective voltage applied to the winding stages.

38. The control system as set forth in claim 33 wherein said pulse width modulating means includes means for modulating the control signals for said first drive means and the control signals for said second drive means substantially equal amounts.

39. The control system as set forth in claim 38 further comprising means for generating a drive selection signal which changes state every commutation, said pulse width modulating means being responsive to a first state of the drive selection signal to shift from modulating the control signals for said first drive means to modulating the control signals for said second drive means upon the expiration of said time after commutation and being responsive to a second state of the drive selection signal to shift from modulating the control signals for said second drive means to modulating the control signals for said first drive means upon the expiration of said time after commutation.

40. The control system as set forth in claim 32 further comprising inhibiting means responsive to a signal indicative of motor current for inhibiting the logic means to prevent the generation of the set of control signals when the motor current exceeds a predetermined maximum value, thereby deenergizaing the winding stages, said inhibiting means preventing the generation of control signals until it is manually reset.

41. The control system as set forth in claim 40 wherein said inhibiting means includes temporary inhibiting means for temporarily inhibiting all but one of the control signals when the motor current exceeds a second predetermined value, the second predetermined current value being less than the predetermined maximum current value, whereby one of the winding stages is left on to allow circulation of the winding currents.

42. The control system as set forth in claim 41 wherein the motor is a two-speed motor, said inhibiting means including means responsive to a speed control signal and to an applied voltage exceeding a predetermined level to reduce the effective voltage applied to the winding stages.

43. The control system as set forth in claim 41 further comprising means for sensing the voltage applied to the winding stages, said temporary inhibiting means being responsive to an applied voltage exceeding a predetermined level to temporarily inhibit all the control signals but one to reduce the effective voltage applied to the winding stages.

44. The control system as set forth in claim 32 further comprising means for sensing a back emf signal indicative of the back emf condition of at least one winding stage, integrating means for integrating a portion of the back emf signal to produce an output indicative of the angular position of the rotatable assembly, and commutation signal generating means responsive to the output of said integrating means for generating a commutation signal when said integrating means output reaches a predetermined level, the commutation signal being the signal representative of the angular position of the rotatable assembly to which said logic means is responsive.

45. The control system as set forth in claim 44 further comprising digital resetting means for resetting said integrating means each time the winding stages are commutated, said digital resetting means including an electronically controlled switch responsive to the commutation signal to reset said integrating means.

46. The control system as set forth in claim 45 wherein said digital resetting means include digital delay means for inhibiting the operation of said integrating means for said time after commutation, whereby commutation currents are prevented from being integrated by said integrating means, said pulse width modulating means being responsive to said digital delay means to shift after said time after commutation to pulse width modulate the control signal associated with the winding stage which will be deenergized after the next commutation.

47. A control system for an electronically commutated motor having a rotatable assembly and a stationary assembly with a plurality of winding stages, said control system comprising:

commutating means responsive to a set of control signals for commutating the winding stages by applying a DC voltage thereto in at least one preselected sequence to cause rotation of the rotatable assembly, each winding stage having at least two terminals, one of which is commonly connected to one terminal of each of the other winding stages and the DC voltage is applied to pairs of other terminals of the winding stages in at least one preselected sequence, said commutating means including first drive means associated with each winding stage for allowing the flow of current through its associated winding stage in a first direction in response to a first one of the control signals and second drive means associated with each winding stage for allowing the flow of current through its associated winding stage in the opposite direction in response to a second one of the control signals;

logic means responsive to a signal representative of the angular position of the rotatable assembly for supplying the control signals to said commutating means in a sequence in which for each commutation one of the winding stages which was energized before commutation remains energized after commutation and the other winding stage which was energized before commutation becomes deenergized after commutation, each winding stage remaining energized through two successive commutations unique to it and then becoming deenergized, the direction of current flow in the winding stage which remains energized after commutation being the same as the direction of current flow in that winding stage before commutation; and pulse width modulating means responsive to respective successive commutations for pulse width modulating the control signals for said first drive means, then shifting to pulse width modulate the control signals for said second drive means upon the expiration of a first time period after one commutation and subsequently shifting back to pulse width modulate the control signals for said first drive means upon the expiration of a second time period after the next commutation.

48. The control system as set forth in claim 47 further comprising inhibiting means responsive to a signal indicative of motor current for inhibiting said logic means to prevent the generation of the set of control signals when the motor current exceeds a predetermined maximum value, thereby turning off said first and second drive means for all the winding stages, said inhibiting means preventing the generation of control signals until it is manually reset.

49. The control system as set forth in claim 48 wherein said inhibiting means includes temporary inhibiting means for temporarily inhibiting all but one of the control signals when the motor current exceeds a second predetermined value, the second predetermined current value being less than the predetermined maximum current value, whereby one of said first and second drive means is left on to allow circulation of the winding currents.

50. The control system as set forth in claim 49 wherein the motor is a two-speed motor, said inhibiting means including means responsive to a speed control signal and to an applied voltage exceeding a predetermined level to reduce the effective voltage applied to the winding stages.

51. The control system as set forth in claim 49 further comprising means for sensing the voltage applied to the winding stages, said temporary inhibiting means being responsive to an applied voltage exceeding a predetermined level to temporarily inhibit all the control signals but one to reduce the effective voltage applied to the winding stages.

52. The control system as set forth in claim 47 further comprising means for sensing a back emf signal indicative of the back emf condition of at least one winding stage, integrating means for integrating a portion of the back emf signal to produce an output indicative of the angular position of the rotatable assembly, and commutation signal generating means responsive to the output of said integrating means for generating a commutation signal when said integrating means output reaches a predetermined level, the commutation signal being the signal representative of the angular position of the rotatable assembly to which said logic means is responsive.

53. The control system as set forth in claim 52 further comprising digital resetting means for resetting said integrating means each time the winding stages are commutated, said digital resetting means including an electronically controlled switch responsive to the commutation signal to reset said integrating means.

54. The control system as set forth in claim 53 wherein said digital resetting means includes digital delay means for inhibiting the operation of said integrating means for the time periods after commutations, whereby commutation currents are prevented from being integrated by said integrating means, said pulse width modulating means being responsive to said digital delay means to shift upon the expiration of the time periods after commutations.

55. A control system for an electronically commutated motor having a rotatable assembly and a stationary assembly with a plurality of winding stages, said control system comprising:

commutating means responsive to a set of control signals for commutating the winding stages by applying a DC voltage thereto in at least one preselected sequence to cause rotation of the rotatable assembly, each winding stage having at least two terminals, one of which is commonly connected to one terminal of each of the other winding stages and the DC voltage is applied to pairs of other terminals of the winding stages in at least one preselected sequence;

logic means responsive to a signal representative of the angular position of the rotatable assembly for supplying the control signals to said commutating means in a sequence in which for each commutation one of the winding stages which was energized before commutation remains energized after commutation and the other winding stage which was energized before commutation becomes deenergized after commutation, each winding stage remaining energized through two successive commutations unique to it and then becoming deenergized, the direction of current flow in the winding stage which remains energized after commutation being the same as the direction of current flow in that winding stage before commutation;

pulse width modulating means for pulse width modulating the control signals; and means responsive to a commutation selection signal for controlling said pulse width modulating means when the commutation selection signal is in a first state to pulse width modulate the control signal associated with the winding stage which is commutated on until a time after commutation and for shifting at that time to pulse width modulate the control signal associated with the winding stage which will be deenergized after the next commutation and for controlling said pulse width modulating means when the commutation selection signal is in a second state to pulse width modulate upon commutation the control signal associated with the winding stage which remained on.

56. The control system as set forth in claim 55 wherein said commutating means includes first drive means associated with each winding stage for allowing the flow of current through its associated winding stage in a first direction in response to a first one of the control signals and second drive means associated with each winding stage for allowing the flow of current through its associated winding stage in the opposite direction in response to a second one of the control signals.

57. The control system as set forth in claim 56 further comprising inhibiting means responsive to a signal indicative of motor current for inhibiting said logic means to prevent the generation of the set of control signals when the motor current exceeds a predetermined maximum value, thereby turning off said first and second drive means for all the winding stages, said inhibiting means preventing the generation of control signals until it is manually reset.

58. The control system as set forth in claim 57 wherein said inhibiting means includes temporary inhibiting means for temporarily inhibiting all but one of the control signals when the motor current exceeds a second predetermined value, the second predetermined current value being less than the predetermined maximum current value, whereby one of said first and second drive means is left on to allow circulation of the winding currents.

59. The control system as set forth in claim 58 wherein the motor is a two-speed motor, said inhibiting means including means responsive to a speed control signal and to an applied voltage exceeding a predetermined level to reduce the effective voltage applied to the winding stages.

60. The control system as set forth in claim 58 further comprising means for sensing the voltage applied to the winding stages, said temporary inhibiting means being responsive to an applied voltage exceeding a predetermined level to temporarily inhibit all the control signals but one to reduce the effective voltage applied to the winding stages.

61. The control system as set forth in claim 56 further comprising means for generating a drive selection signal every other commutation, said pulse width modulating means being responsive to a first state of the drive selection signal to shift from modulating the control signals for said first drive means to modulating the control signals for said second drive means and being responsive to a second state of the drive selection signal to shift from modulating the control signals for said second drive means to modulating the control signals for said first drive means, the second and first states of the commutation selection signal respectively determining whether the shifting occurs upon commutation or at said time after commutation.

62. A control system for an electronically commutated motor having a rotatable assembly and a stationary assembly with a plurality of winding stages, said control system comprising:

commutating means responsive to a set of control signals for commutating the winding stages by applying a DC voltage thereto in at least one preselected sequence to cause rotation of the rotatable assembly, each winding stage having at least two terminals, one of which is commonly connected to one terminal of each of the other winding stages and the DC voltage is applied to pairs of other terminals of the winding stages in at least one preselected sequence, said commutating means including first drive means associated with each winding stage for allowing the flow of current through its associated winding stage in a first direction in response to a first one of the control signals and second drive means associated with each winding stage for allowing the flow of current through its associated winding stage in the opposite direction in response to a second one of the control signals;

logic means responsive to a signal representative of the angular position of the rotatable assembly for supplying the control signals to said commutating means in a sequence in which for each commutation one of the winding stages which was energized before commutation remains energized after commutation and the other winding stage which was energized before commutation becomes deenergized after commutation, each winding stage remaining energized through two successive commutations unique to it and then becoming deenergized, the direction of current flow in the winding stage which remains energized after commutation being the same as the direction of current flow in that winding stage before commutation;

means for generating a drive selection signal which changes state every commutation; and means responsive to the drive selection signal for pulse width modulating the control signals for said first drive means and then shifting to pulse width modulate the control signals for said second drive means when the drive selection signal changes state upon commutation and subsequently shifting back to pulse width modulate the control signals for said first drive means when the drive selection signal again changes state upon the next commutation.

63. The control system as set forth in claim 62 further comprising inhibiting means responsive to a signal indicative of motor current for inhibiting said logic means to prevent the generation of the set of control signals when the motor current exceeds a predetermined maximum value, thereby turning off said first and second drive means for all the winding stages, said inhibiting means preventing the generation of control signals until it is manually reset.

64. The control system as set forth in claim 63 wherein said inhibiting means includes temporary inhibiting means for temporarily inhibiting all but one of the control signals when the motor current exceeds a second predetermined value, the second predetermined current value being less than the predetermined maximum current value, whereby one of said first and second drive means is left on to allow circulation of the winding currents.

65. The control system as set forth in claim 64 wherein the motor is a two-speed motor, said inhibiting means including means responsive to a speed control signal and to an applied voltage exceeding a predetermined levl to reduce the effective voltage applied to the winding stages.

66. The control system as set forth in claim 64 further comprising means for sensing the voltage applied to the winding stages, said temporary inhibiting means being responsive to an integral of the applied voltage exceeding a predetermined level to temporarily inhibit all the control signals but one to reduce the effective voltage applied to the winding stages.

67. A control system for an electronically commutated, two-speed motor having a rotatable assembly and a stationary assembly with a plurality of winding stages, the control system comprising:

commutating means responsive to a set of control signals for commutating the winding stages by applying a DC voltage thereto in at least one preselected sequence to cause rotation of the rotatable assembly;

back emf sensing means for sensing a back emf signal indicative of the back emf condition of at least one winding integrating means for integrating a portion of the back emf signal and for producing a commutation signal indicative of a predetermined angular position of the rotatable assembly;

control signal means responsive to the commutation signal for providing the set of control signals to said commutating means to commutate the winding stages when the rotatable assembly reaches the predetermined angular position; and time constant providing means responsive to a speed control signal for providing two different time constants for said integrating means corresponding to the two speeds of the motor.

68. The control system as set forth in claim 67 further comprising digital delay means for inhibiting the operation of said integrating means for a predetermined interval of time after the occurrence of the commutation signal whereby commutation currents are prevented from being integrated by said integrating means.

69. The control system as set forth in claim 67 wherein the winding stages have respective terminals, the control system further comprising means for approximating a neutral conductor voltage for the motor and wherein said back emf sensing means includes means for comparing the approximated neutral conductor voltage with the terminal voltage of one of the winding stages.

70. The control system as set forth in claim 67 wherein said time constant providing means includes a pair of electronically controlled switches responsive to the commutation signal to inhibit integration by said integrating means.

71. The control system as set forth in claim 67 wherein said time constant providing means includes a pair of electronically controlled switches and logic circuitry for preventing both switches from being closed at the same time.

72. A laundering apparatus comprising in combination:

a rotatable component;

an electronically commutated motor, said motor comprising rotatable assembly means for driving the rotatable component and a stationary assembly with a plurality of winding stages;

a control system connected to said motor; and means for applying a DC voltage to said control system;

said control system including controlling means for controlling the application of the DC voltage to provide a resultant effective voltage to said winding stages, said controlling means including commutating means for commutating said winding stages by applying the DC voltage thereto in at least one preselected sequence to cause rotation of said rotatable assembly means, thereby to cause rotation of said rotatable component;

approximating means for approximating a neutral conductor voltage for said motor wherein said approximating means has outputs for each of a plurality of pairs of said winding stages, the voltage on each output being a function of the sum of the terminal voltages of its associated pair of winding stages; and comparing means for comparing the approximated neutral conductor voltage with the terminal voltage of one of said winding stages, the output of said comparing means representing the angular position of said rotatable assembly means;

said controlling means further including means responsive to the output of said comparing means to cause said commutating means to commutate said winding stages when said rotatable assembly means reaches a predetermined angular position.

73. The laundering apparatus as set forth in claim 72 wherein the back emf of each of the winding stages has different polarities relative to neutral upon different commutations, and further comprising first electronically controlled switch means for connecting the outputs of said approximating means to a selected one of two inputs of said comparing means, said first electronically controlled switch means being responsive to said controlling means to connect to said selected one input of said comparing means at a particular time only that output of said approximating means associated with the pair of winding stages to which the effective voltage is being provided at that time, and second electronically controlled switch means responsive to said controlling means for selectively connecting said winding stages to the other of said two inputs of said comparing means, thereby to maintain the same polarity of the back emf relative to neutral across said two inputs of said comparing means upon different commutations.

74. The laundering apparatus as set forth in claim 72 further comprising electronically controlled switch means for connecting the outputs of said approximating means to said comparing means, said electronically controlled switch means being responsive to said controlling means to connect said comparing means at a particular time only to that output of the approximating means associated with said pair of winding stages to which the effective voltage is being provided at that time.

75. The laundering apparatus as set forth in claim 72 wherein
said comparing means for comparing the approximated neutral conductor voltage with the terminal voltage of one of said winding stages includes
integrator means for integrating the back emf of one of said winding stages to which the effective voltage is not being provided at a given time relative to the approximated neutral conductor voltage, and
means for generating a commutation signal when said integrator means output reaches a predetermined level, the commutation signal being the output of said comparing means.

76. A laundering apparatus comprising in combination:
a rotatable component;
an electronically commutated DC motor, said motor comprising rotatable assembly means for driving the rotatable component and a stationary assembly with a plurality of winding stages;
a control system connected to said motor; and
means for applying a DC voltage to said control system;
said control system commutating including means responsive to a set of control signals for commutating said winding stages by applying the DC voltage thereto in at least one preselected sequence to cause rotation of said rotatable assembly means;
integrating means for integrating a portion of a back emf signal indicative of the back emf condition of at least one of said winding stages to produce an output indicative of the angular position of said rotatable assembly means;
first pulse generating means responsive to the output of said integrating means for generating a pulse when said integrating means output reaches a predetermined level;
control signal means connected to said first pulse generating means for providing the set of control signals to said commutating means in response to receipt of a pulse to commutate said winding stages, said control signal means including inhibiting means for inhibiting the operation of said integrating means for first lengths of time after corresponding occurrences of the pulse from said first pulse generating means so that the first lengths of time are approximately a predetermined fraction of respective varying lengths of time between successive commutations, whereby commutation currents are prevented from affecting said integrating means.

77. The laundering apparatus as set forth in claim 76 wherein said inhibiting means includes means for generating sets of clock pulses having a first rate and a second faster rate counting means for counting the clock pulses, means for causing said counting means to count the clock pulses at the first rate until a pulse from said first pulse generating means occurs, and then to count in reverse at the second rate until a predetermined count is reached and then to resume counting the clock pulses at the first rate until the nest pulse occurs, and means for disabling the operation of said integrating means while the counting is reversed, thereby defining the first lengths of time.

78. A laundering apparatus comprising a combination:
a rotatable component;
an electronically commutated motor, said motor comprising rotatable assembly means for driving the rotatable component and a stationary assembly with a plurality of winding stages;
a control system connected to said motor; and
means for supplying a DC voltage to said control system;
said control system including commutating means responsive to a set of control signals for commutating said winding stages by applying the DC voltage thereto in at least one preselected sequence to cause rotation of said rotatable assembly means, each winding stage having at least two terminals, one of which is commonly connected to one terminal of each of the other winding stages and the DC voltage is applied to pairs of other terminals of said winding stages in at least one preselected sequence;
logic means responsive to a signal representative of the angular position of said rotatable assembly means for supplying the control signals to said commutating means in a sequence in which for each commutation one of said winding stages which was energized before commutation remains energized after commutation and another winding stage which was energized before commutation becomes deenergized after commutation, each winding stage remaining energized through two successive commutations unique to it and then becoming deenergized, the direction of current flow in said winding stage which remains energized after commutation being the same as the direction of current flow in that winding stage before commutation; and
pulse width modulating means for pulse width modulating the control signal associated with said winding stage which was commutated on until a time after commutation and for shifting at that time a pulse width modulate the control signal associated with said winding stage which will be deenergized after the next commutation.

79. The laundering apparatus as set forth in claim 78 wherein said commutating means includes first drive means associated with each winding stage for allowing the flow of current through its associated winding stage in a first direction in response to a first one of the control signals and second drive means associated with each winding stage for allowing the flow of current through its associated winding stage in the opposite direction in response to a second one of the control signals.

80. The laundering apparatus as set forth in claim 79 further comprising inhibiting means responsive to a signal indicative of motor current for inhibiting said logic means to prevent the generation of the set of control signals when the motor current exceeds a predetermined maximum value, thereby turning off said first and second drive means for all said winding stages, said inhibiting means preventing the generation of control signals until it is manually reset.

81. The laundering apparatus as set forth in claim 80 wherein said inhibiting means includes temporary inhibiting means for temporarily inhibiting all but one of the control signals when the motor current exceeds a second predetermined value, the second predetermined current value being less than the predetermined maximum current value, whereby one of said first and second drive means is left on to allow circulation of the winding currents.

82. The laundering apparatus as set forth in claim 81 wherein said motor is a two-speed motor, said inhibiting means including means responsive to a speed control signal for providing two different predetermined second current values corresponding to the two speeds of said motor.

83. The laundering apparatus as set forth in claim 81 further comprising means for sensing the voltage applied to said winding stages said temporary inhibiting means being responsive to an integral of the applied voltage exceeding a predetermined level to temporarily inhibit all the control signals but one to reduce the effective voltage applied to said winding stages.

84. The laundering apparatus as set forth in claim 79 wherein said pulse width modulating means includes means for modulating the control signals for said first drive means and the control signals for said second drive means substantially equal amounts.

85. The laundering apparatus as set forth in claim 84 further comprising means for generating a drive selection signal every other commutation, said pulse width modulating means being responsive to a first state of the drive selection signal to shift from modulating the control signals for said first drive means to modulating the control signals for said second drive means upon the expiration of said time after commutation and being responsive to a second state of the drive selection signal to shift from modulating the control signals for said second drive means to modulating the control signals for said first drive means upon the expiration of said time after commutation.

86. The laundering apparatus as set forth in claim 78 further comprising means for sensing a back emf signal indicative of the back emf condition of at least one winding stage, intergrating means for integrating a portion of the back emf signal to produce an output indicative of the angular position of said rotatable assembly means, and pulse generating means responsive to the output of said integrating means for generating a commutation pulse when said intergrating means output reaches a predetermined level, the pulse being the signal representative of the angular position of said rotatable assembly means to which said logic means is responsive.

87. The laundering apparatus as set forth in claim 86 further comprising digital resetting means for resetting said integrating means each time said winding stages are commutated, said digital resetting means including an electronically controlled switch responsive to the commutation pulse to reset said integrating means.

88. The laundering apparatus as set forth in claim 87 wherein said digital resetting means includes digital delay means for inhibiting the operation of said integrating means for said time after commutation, whereby commutation currents are prevented from being integrated by said integrating means, said pulse width modulating means being responsive to said digital delay means to shift after said time after commutation.

89. The laundering apparatus as set forth in claim 87 wherein said motor is a two-speed motor, said control system further including means responsive to a speed control signal for providing two different time constants for said integrating means corresponding to the two speeds of said motor.

90. A laundering apparatus comprising in combination:
a rotatable component;
an electronically commutated motor, said motor comprising rotatable assembly means for driving the rotatable component and a stationary assembly with a plurality of winding stages;
a control system connected to said motor; and
means for applying a DC voltage to said control system;
said control system including commutating means for commutating said winding stages by applying the DC voltage thereto in at least one preselected sequence to cause rotation of said rotatable assembly means;
pulse width modulating means connected to said commutating means for pulse width modulating the DC voltage so that the DC voltage is applied by said commutating means in voltage pulses having a predetermined maximum duty cycle; and
integrating means connected to said pulse width modulating means for repeatedly integrating the DC voltage over the width of each of the voltage pulses and truncating each of the voltage pulses upon the integration reaching a predetermined level, said integrating means being reset before each voltage pulse.

91. The laundering apparatus as set forth in claim 90 wherein said winding stages have low and high speed connections and have an IR voltage drop depending on which of the low or high speed connections is energized when current passes through said winding stages, said control system further comprising means responsive to a speed control signal indicative of which connection is energized, for sensing the current passing through said winding stages and effectively adjusting the predetermined level of said means for repeatedly integrating the DC voltage by an amount dependent upon the current sensed and said speed control signal, whereby voltage regulation for compensation of the IR voltage drop on both the low and high speed connections is achieved.

92. A laundering apparatus comprising in combination:
a rotatable component;
an electronically commutated motor, said motor comprising rotatable assembly means for driving the rotatable component and a stationary assembly with a plurality of winding stages;

a control system connected to said motor; and means for supplying a DC voltage to said control system;

said control means including commutating means responsive to a set of control signals for commutating said winding stages by applying the DC voltage thereto in at least one preselected sequence to cause rotation of said rotatable assembly means, each winding stage having at least two terminals, one of which is commonly connected to one terminal of each of the other winding stages and the DC voltage is applied to pairs of other terminals of said winding stages in at least one preselected sequence, said commutating means including first drive means associated with each winding stage for allowing the flow of current through its associated winding stage in a first direction in response to a first one of the control signals and second drive means associated with each winding stage for allowng the flow of current through its associated winding stage in the opposite direction in response to a second one of the control signals;

logic means responsive to a signal representative of the angular position of said rotatable assembly means for supplying the control signals to said commutating means in a sequence in which for each commutation one of said winding stages which was energized before commutation remains energized after commutation and another winding stage which was energized before commutation becomes deenergized after commutation, each winding stage remaining energized through two successive commutations unique to it and then becoming deenergized, the direction of current flow in said winding stage which remains energized after commutation being the same as the direction of current flow in that winding stage before commutation; and pulse width modulating means responsive to respective successive commutations for pulse width modulating the control signals for said first drive means, then shifting to pulse width modulate the control signals for said second drive means upon the expiration of a first time period after one commutation and subsequently shifting back to pulse width modulate the control signals for the first drive means upon the expiration of a second time period after the next commutation.

93. The laundering apparatus as set forth in claim 92 further comprising inhibiting means responsive to a signal indicative of motor current for inhibiting said logic means to prevent the generation of the set of control signals when the motor current exceeds a predetermined maximum value, thereby turning off said first and second drive means for all said winding stages, said inhibiting means preventing the generation of control signals until it is manually reset.

94. The laundering apparatus as set forth in claim 93 wherein said inhibiting means includes temporary inhibiting means for temporarily inhibiting all but one of the control signals when the motor current exceeds a second predetermined value, the second predetermined current value being less than the predetermined maximum current value, whereby one of said first and second drive means is left on to allow circulation of the winding currents.

95. The laundering apparatus as set forth in claim 94 wherein said motor is a two-speed motor, said inhibiting means including means responsive to a speed control signal for providing two different predetermined second current values corresponding to the two speeds of said motor.

96. The laundering apparatus as set forth in claim 94 further comprising means for sensing the voltage applied to said winding stages, said temporary inhibiting means being responsive to an integral of the applied voltage exceeding a predetermined level to temporarily inhibit all the control signals but one to reduce the effective voltage applied to said winding stages.

97. The laundering apparatus as set forth in claim 92 further comprising means for sensing a back emf signal indicative of the back emf condition of at least one winding stage, intergrating means for integrating a portion of the back emf signal to produce an output indicative of the angular position of said rotatable assembly means, and pulse generating means responsive to the output of said integrating means for generating a commutation pulse when said intergrating means output reaches a predetermined level, the pulse being the signal representative of the angular position of said rotatable assembly means to which said logic means is responsive.

98. The laundering apparatus as set forth in claim 97 further comprising digital resetting means for resetting said integrating means each time said winding stages are commutated, said digital resetting means including an electronically controlled switch responsive to the commutation pulse to reset said integrating means.

99. The laundering apparatus as set forth in claim 98 wherein said digital resetting means includes digital delay means for inhibiting the operation of said integrating means for said time periods after commutations, whereby commutation currents are prevented from being integrated by said integrating means, said pulse width modulating means being responsive to said digital delay means to shift upon the expiration of said time periods after commutations.

100. The laundering apparatus as set forth in claim 98 wherein said motor is a two-speed DC motor, said control system further including means responsive to a speed control signal for providing two different time constants for said integrating means corresponding to the two speeds of said motor.

101. A laundering apparatus comprising in combination:

a rotatable component;

an electronically commutated, two-speed motor, said motor comprising rotatable assembly means for driving the rotatable component and a stationary assembly with a plurality of winding stages;

a control system connected to said motor; and means for applying a DC voltage to said control system;

said control system including commutating means responsive to a set of control signals for commutating said winding stages by applying the DC voltage thereto in at least one preselected sequence to cause rotation of said rotatable assembly means;

back emf sensing means for sensing a back emf signal indicative of the back emf condition of at least one winding stage;

integrating means for integrating a portion of the back emf signal and for producing a commutation signal indicative of a predetermined angular position of said rotatable assembly means; and control signal means responsive to the commutation signal for providing the set of control signals to said commutating means to commutate said winding stages when said rotatable assembly means reaches the predetermined angular position; and means responsive to a speed control signal for providing two different time constants for said integrating means corresponding to the two speeds of said motor.

102. The laundering apparatus as set forth in claim 101 further comprising digital delay means for inhibiting the operation of said integrating means for an interval of time after the occurrence of the commutation signal whereby commutation currents are prevented from being integrated by said integrating means.

103. The laundering apparatus as set forth in claim 101 wherein said winding stages have respective terminals, the laundering apparatus further comprising means for approximating a neutral conductor voltage for said motor and wherein said back emf sensing means includes means for comparing the approximated neutral conductor voltage with the terminal voltage of one of said winding stages.

104. A method of operating an electronically commutated motor with the motor having a rotatable assembly and a stationary assembly with a plurality of winding stages, the method comprising the steps of:
commutating the winding stages by applying a DC voltage thereto in at least one preselected sequence to cause rotation of the rotatable assembly;
approximating a neutral conductor voltage for the motor at outputs corresponding to each of a plurality of pairs of the winding stages, the voltage on each of the outputs being a function of the sum of the terminal voltages of its corresponding pair of winding stages; and
comparing the approximated neutral conductor voltage with the terminal voltage of one of the winding stages, the result of the comparison representing the angular position of the rotatable assembly;
the commutation of the winding stages occurring when the rotatable assembly reaches a predetermined angular position.

105. The method as set forth in claim 104 wherein the motor has three winding stages, the effective voltage being provided to only two of the stages at a time, the approximating step including summing the terminal voltages of the two stages to which the effective voltage is being provided at that time.

106. The method as set forth in claim 104 wherein the comparing step includes the steps of:
integrating the back emf of one of the winding stages relative to the approximated neutral conductor voltage to provide a signal representing the angular position of the rotatable assembly; and
generating a commutation signal when the integration result reaches a predetermined level.

107. The method as set forth in claim 106 including the further step of inhibiting the integrating step for respective intervals of time after occurrences of the commutation signal so that the intervals of time are approximately a predetermined fraction of respective varying lengths of time between successive occurrences of the commutation signal.

108. The method as set forth in claim 104 wherein the DC voltage is provided to fewer than all the winding stages at a time, the terminal voltage for the comparison being obtained from a winding stage not having the DC voltage applied to it at that time, and the approximating step including summing the terminal voltages of at least two of the winding stages to which the effective voltage is being provided at that time.

109. The method as set forth in claim 104 further including selectively switching to said winding stages and to the outputs for said approximated neutral voltage to maintain the same polarity of back emf relative to neutral upon different commutations for use in said comparing step.

110. A method of operating an electronically commutated motor with the motor having a rotatable assembly and a stationary assembly with a plurality of winding stages, the method comprising the steps of:
commutating the winding stages in response to a set of control signals by applying the DC voltage thereto in at least one preselected sequence to cause rotation of the rotatable assembly;
sensing a back emf signal indicative of the back emf condition of at least one winding stage;
producing a commutation signal indicative of a predetermined angular position of the rotatable assembly in response to the sensed back emf signal;
providing the set of control signals in response to the commutation signal to commutate the winding stages when the rotatable assembly reaches the predetermined angular position; and
inhibiting the sensing step for respective intervals of time after occurrences of the commutation signal so that the intervals of time are approximately a predetermined fraction of respective varying lengths of time between successive occurrences of the commutation signal, whereby commutation currents are prevented from being sensed.

111. The method as set forth in claim 110 wherein the respective intervals of time correspond to approximately twenty electrical degrees of rotation of the rotatable assembly.

112. The method as set forth in claim 110 wherein the inhibiting step includes repeatedly causing an electrical signal to increase at a first rate until the commutation signal occurs and then to decrease from a value so attained at a faster rate until a predetermined electrical value is reached and then to increase again at the first rate until the next commutation signal occurs, thereby defining the respective intervals of time when the electrical signal is changing at the faster rate.

113. The method as set forth in claim 110 wherein the inhibiting step includes generating sets of clock pulses having a first rate and a second faster rate;
counting the clock pulses at the first rate until the commutation signal occurs and then counting in reverse at the faster rate until a predetermined count is reached and then resuming counting the clock pulses at the first rate until the next commutation signal occurs; and
preventing the sensing while the counting is reversed, thereby defining the respective intervals of time.

114. The method as set forth in claim 110 further including the step of digitally providing a starting pulse to initiate rotation of the rotatable assembly unless the commutation signal occurs before the expiration of a predetermined time interval.

115. The method as set forth in claim 110 wherein the motor is a two-speed motor, and the commutation signal producing step including integrating at a first rate in response to one state of a speed control signal and integrating at a second rate in response to a second state of the speed control signal, the two states of the speed control signal corresponding to the two speeds of the motor.

116. The method as set forth in claim 110 further including the steps of pulse width modulating the set of control signals and reducing the duty cycle of the pulses of the DC voltage thereby applied to the winding stages in response to an integration of the DC voltage reaching a predetermined level.

117. A method of operating an electronically commutated motor with the motor having a rotatable assembly and a stationary assembly with a plurality of winding stages, the method comprising the steps of:
commutating the winding stages by applying a DC voltage thereto in at least one preselected sequence to cause rotation of the rotatable assembly;
pulse width modulating the DC voltage so that the DC voltage is applied in said commutating step in voltage pulses having a predetermined maximum duty cycle; and
controlling said pulse width modulating by repeatedly integrating the DC voltage over the width of each of the voltage pulses, the integrating beginning from a value that is reset before each voltage pulse, and truncating each of the voltage pulses upon the integrating reaching a predetermined level.

118. A method of operating an electronically commutated motor with the motor having a rotatable assembly and a stationary assembly with a plurality of winding stages, the method comprising the steps of:
receiving a DC voltage for application to the motor;
commutating the winding stages in response to a set of control signals by applying the DC voltage thereto in at least one preselected sequence to cause rotation of the rotatable assembly;
sensing the angular position of the rotatable assembly and providing a commutation signal indicative of a predetermined angular position of the rotatable assembly;
providing the set of control signals to commutate the winding stages when the rotatable assembly reaches the predetermined angular position; and
inhibiting the generation of the set of control signals when the motor current exceeds a predetermined maximum value, the inhibition being maintained until it is manually overridden.

119. The method as set forth in claim 118 wherein the inhibiting step includes temporarily inhibiting less than all the control signals when the motor current exceeds a second predetermined value, the second predetermined current value being less than the predetermined maximum current value.

120. The method as set forth in claim 119 including sensing the DC voltage applied to the winding stages and temporarily inhibiting all the control signals but one to reduce the effective voltage applied to the winding stages when the integral of the DC voltage exceeds a predetermined level.

121. A method of operating an electronically commutated motor with the motor having a rotatable assembly and a stationary assembly with a plurality of winding stages, the method comprising the steps of:
commutating the winding stages in response to a set of control signals by applying a DC voltage thereto in at least one preselected sequence to cause rotation of the rotatable assembly, each winding stage having at least two terminals, one of which is commonly connected to one terminal of each of the other winding stages and the DC voltage is applied to pairs of other terminals of the winding stages in at least one preselected sequence;
supplying the control signals in a sequence in which for each commutation one of the winding stages which was energized before commutation remains energized after commutation and the other winding stage which was energized before commutation becomes deenergized after commutation, each winding stage remaining energized through two successive commutations unique to it and then becoming deenergized, the direction of current flow in the winding stage which remains energized after commutation being the same as the direction of current flow in that winding stage before commutation; and
pulse width modulating the control signal associated with the winding stage which was commutated on until a time after commutation and shifting at that time to pulse width modulate the control signal associated with the winding stage which will be deenergized after the next commutation.

122. The method as set forth in claim 121 wherein the winding stages have associated therewith drive means for selectively allowing the flow of current through at least one of the winding stages in a first direction in response to some of the control signals and second drive means for selectively allowing the flow of current through at least one of the winding stages in the opposite direction in response to others of the control signals, wherein the pulse width modulating step includes modulating the control signals for the first drive means and the control signals for the second drive means substantially equal amounts.

123. The method as set forth in claim 122 further including generating a drive selection signal every other commutation, and shifting in response to a first state of the drive selection signal from modulating the control signals for the first drive means to modulating the control signals for the second drive means upon the expiration of said time after commutation and shifting in response to a second state of the drive selection signal from modulating the control signals for the second drive means to modulating the control signals for the first drive means upon the expiration of said time after commutation.

124. The method as set forth in claim 121 further including sensing a back emf signal indicative of the back emf condition of at least one winding, integrating a portion of the back emf signal to produce an output indicative of the angular position of the rotatable assembly, and generating a commutation signal when the integration output reaches a predetermined level, the commutation signal representing the angular position of the rotatable assembly.

125. The method as set forth in claim 124 including inhibiting the integration between a commutation and said time after commutation, whereby commutation currents are prevented from being integrated by the integrating means.

126. A method of operating an electronically commutated motor with the motor having a rotatable assembly and a stationary assembly with a plurality of winding stages, the method comprising the steps of:
a commutating the winding stages in response to a set of control signals by applying a DC voltage thereto in at least one preselected sequence to cause rotation of the rotatable assembly, the winding stages being connected together at one end whereby the DC voltage is applied to a pair of winding stages at a time, and wherein each winding stage has associated therewith first drive means for allowing the flow of current through its associated winding stage in a first direction in response to a first one of the control signals and second drive means for allowing the flow of current through its associated winding stage in the opposite direction in response to a second one of the control signals;

supplying the control signals in a sequence in which for each commutation one of the winding stages which was energized before commutation remains energized after commutation and the other winding stage which was energized before commutation becomes deenergized after commutation, each winding stage remaining energized through two successive commutations unique to it and then becoming deenergized, the direction of current flow in the winding stage which remains energized after commutation being the same as the direction of current flow in that winding stage before commutation; and pulse width modulating upon commutation the control signal associated with the winding stage which remains energized by generating a drive selection signal every other commutation and in response to a first state of the drive selection signal shifting from modulating the control signals for the first drive means to modulating the control signals for the second drive means upon commutation and in response to a second state of the drive selection signal shifting from modulating the control signals for the second drive means to modulating the control signals for the first drive means upon commutation.

127. The method as set forth in claim 126 further including sensing the motor current and inhibiting generation of the set of control signals when the motor current exceeds a predetermined maximum value, thereby turning off the first and second drive means for all the winding stages, said inhibiting preventing the generation of control signals until it is manually overridden.

128. The method as set forth in claim 127 including temporarily inhibiting all but one of the control signals when the motor current exceeds a second predetermined value, the second predetermined current value being less than the predetermined maximum current value, whereby one of the drive means is left on to allow circulation of the winding currents.

129. The method as set forth in claim 128 including sensing the voltage applied to the winding stages and, in response to an integral of the applied voltage exceeding a predetermined level, temporarily inhibiting all the control signals but one to reduce the effective voltage applied to the winding stages.

130. A method of operating an electronically commutated, two-speed motor with the motor having a rotatable assembly and a stationary assembly with a plurality of winding stages, the method comprising the steps of:

commutating the winding stages in response to a set of control signals by applying a DC voltage thereto in at least one preselected sequence to cause rotation of the rotatable assembly;

sensing a back emf signal indicative of the back emf condition of at least one winding;

integrating a portion of the back emf signal and producing a commutation signal indicative of a predetermined angular position of the rotatable assembly, the integration occurring at a first rate when the motor is being operated at one speed and occurring at a second rate when the motor is being operated at the second speed, the rate of integration being determined by a speed control signal; and providing the set of control signals in response to the commutation signal to commutate the winding stages when the rotatable assembly reaches the predetermined angular position.

131. The method as set forth in claim 130 further including digitally inhibiting the integration for a time after the occurrence of the commutation signal, whereby commutation currents are prevented from being integrated by the integrating means.

132. The method as set forth in claim 130 wherein the winding stages have respective terminals, the method further including approximating a neutral conductor voltage for the motor and wherein the back emf sensing step includes comparing the approximated neutral conductor voltage with the terminal voltage of one of the winding stages.

* * * * *